(12) United States Patent
Haeberli et al.

(10) Patent No.: US 7,190,370 B1
(45) Date of Patent: Mar. 13, 2007

(54) PREVIEWING AND MANIPULATING A FRAMED IMAGE PRINT

(75) Inventors: Paul Haeberli, San Francisco, CA (US); John Skidgel, San Francisco, CA (US)

(73) Assignee: Shutterfly, Inc., Redwood City, CA (US)

( * ) Notice: Subject to any disclaimer, the term of this patent is extended or adjusted under 35 U.S.C. 154(b) by 1086 days.

(21) Appl. No.: 09/721,437

(22) Filed: Nov. 22, 2000

Related U.S. Application Data

(63) Continuation-in-part of application No. 09/684,595, filed on Oct. 5, 2000.

(51) Int. Cl.
*G09G 5/00* (2006.01)

(52) U.S. Cl. ....................... 345/582; 345/629

(58) Field of Classification Search ................. 345/582, 345/440, 581, 619, 629; 382/112; 709/250; 707/517, 526
See application file for complete search history.

(56) References Cited

U.S. PATENT DOCUMENTS

| | | | | |
|---|---|---|---|---|
| 4,920,337 A * | 4/1990 | Kuo ........................... 707/526 |
| 5,343,386 A * | 8/1994 | Barber ........................ 700/90 |
| 5,369,736 A * | 11/1994 | Kato et al. .................. 345/582 |
| 5,550,960 A * | 8/1996 | Shirman et al. ............ 345/582 |
| 5,577,179 A * | 11/1996 | Blank .......................... 345/639 |
| 5,687,306 A * | 11/1997 | Blank .......................... 345/634 |
| 5,844,565 A * | 12/1998 | Mizutani et al. ............ 345/581 |
| 5,845,303 A * | 12/1998 | Templeman ................. 707/517 |
| 5,870,771 A * | 2/1999 | Oberg ......................... 707/502 |
| 5,898,438 A * | 4/1999 | Stewart et al. .............. 345/419 |
| 5,909,220 A * | 6/1999 | Sandow ....................... 345/589 |
| 5,986,670 A * | 11/1999 | Dries et al. ................. 345/629 |
| 5,990,901 A * | 11/1999 | Lawton et al. .............. 345/581 |
| 6,014,137 A * | 1/2000 | Burns .......................... 345/747 |
| 6,031,542 A * | 2/2000 | Wittig ......................... 345/426 |
| 6,047,130 A * | 4/2000 | Oles ............................... 396/1 |
| 6,064,399 A * | 5/2000 | Teo ............................. 345/629 |
| 6,065,969 A * | 5/2000 | Rifkin et al. ............... 434/100 |
| 6,154,601 A * | 11/2000 | Yaegashi et al. ............. 386/52 |
| 6,167,382 A * | 12/2000 | Sparks et al. ................ 705/26 |
| 6,169,815 B1 * | 1/2001 | Aoki et al. .................. 382/100 |
| 6,202,073 B1 * | 3/2001 | Takahashi .................... 707/517 |
| 6,356,288 B1 * | 3/2002 | Freeman et al. ............ 345/867 |
| 6,424,351 B1 * | 7/2002 | Bishop et al. .............. 345/582 |
| 6,437,749 B2 * | 8/2002 | Nagayama et al. ......... 343/713 |
| 6,453,361 B1 * | 9/2002 | Morris ........................ 709/250 |
| 6,751,339 B1 * | 6/2004 | Windle et al. .............. 382/108 |
| 2001/0010772 A1 * | 8/2001 | Nakajima ..................... 400/62 |
| 2002/0030638 A1 * | 3/2002 | Weiner ........................ 345/30 |

(Continued)

*Primary Examiner*—Ryan Yang
(74) *Attorney, Agent, or Firm*—Xin Wen

(57) ABSTRACT

An apparatus and method of generating a visual representation of an image based product. Where the image based product is a picture image, the method produces a framed prototype image showing the picture image framed within a frame. The method includes providing a frame image showing the frame in a perspective view. The frame image has a picture portion corresponding to the portion of the frame used to view a picture mounted in the frame. The method includes mapping the picture image to the picture portion of the frame image in order to generate the frame prototype image. The method also includes presenting an enhanced edit set along with the frame prototype image. The enhanced edit set includes user manipulatable tools for editing either the picture or the frame in the perspective view.

26 Claims, 27 Drawing Sheets

U.S. PATENT DOCUMENTS

2002/0070982 A1* 6/2002 Hill et al. .................. 345/835
2002/0093538 A1* 7/2002 Carlin ....................... 345/778
2002/0118209 A1* 8/2002 Hylen ....................... 345/582

* cited by examiner

PREVIEWING AND MANIPULATING A FRAMED IMAGE PRINT

This application is a continuation-in-part (and claims the benefit of priority under 35 USC 120) of U.S. application Ser. No. 09/684,595, filed Oct. 5, 2000. The disclosure of the prior application is considered part of (and is incorporated by reference in) the disclosure of this application.

TECHNICAL FIELD

The application relates generally to image processing systems, and more particularly to a method and system of previewing a framed image print.

BACKGROUND

One conventional way to display image prints (e.g., photographs) is to mount the image print in a frame. A wide variety of frames are available, differing, for example, in size, style, construction material, and shape. Typically, a customer will select a particular frame in which to mount an image print based, at least in part, on how the image print would look mounted in the selected frame.

For example, a customer can take a picture using a conventional film-based camera and then bring the exposed film to a photo finishing laboratory to have the laboratory develop the exposed film and generate an image print (which is typically referred to as a "photograph" in the film-based photography context). The photograph is then returned to the customer, who can then physically take the photograph to a frame shop (that is, to a "brick-and-mortar" frame shop) in order to select a frame in which to mount the photograph. In selecting the frame, the customer can physically place the photograph in or near a given frame in order to get an idea of how the photograph would look mounted in that particular frame. In this way, the customer can relatively quickly determine how the photograph would look mounted in various frames.

When a customer wishes to have a high-quality image print generated from a digital image file (for example, one captured using a digital camera), the customer need not physically take the digital image file to a photo-finishing laboratory and instead can electronically transmit the digital image file to an "online" photo-finishing laboratory using a computer network such as the Internet. For example, the customer can execute an Internet browser program (referred to here as a "browser") such as NETSCAPE NAVIGATORS (which is commercially available from Netscape Communications Corporation of Mountain View, Calif., USA), direct the browser to a web site associated with the online photo-finishing laboratory, and upload a digital image file to a server hosting the web site. The online photo-finishing laboratory can then take the digital image file from the web server and produce a high-quality image print from the digital image file in a conventional manner. The online photo-finishing laboratory then typically sends the high-quality image print to the customer (or another person designated by the customer such as a relative or friend) using a delivery service such as the UNITED STATES POSTAL SERVICE or FEDERAL EXPRESS®.

Some online print laboratories also allow a customer to select and purchase frames via their web sites. However, the customer typically cannot physically place an image print in or near various frames in order to visualize how an image print will look in various frames, as can be done in a traditional brick-and-mortar frame shop. One conventional approach to helping the customer visualize how an image print will look in a given frame is to create, and display for the customer, a frame preview image in which an electronic copy of the customer's image (referred to here as a "picture image") is pasted into a two-dimensional picture of a given frame (referred to here as a "frame image"). FIG. 1 illustrates one example of such a conventional frame preview image 100. The customer's image 102 is pasted into the portion 104 of the frame image 106 corresponding to the part of the frame where an image print would be mounted (referred to here as the "picture area"). Such a conventional approach is implemented by EFRAMES.COM™, an online print laboratory and frame retailer located on the Internet at www.eframes.com. As shown in FIG. 1, a frame preview image generated according to such a conventional approach typically only shows a head-on (that is, non-perspective) view of the framed image print itself.

SUMMARY

In one aspect the invention provides a method of generating a frame prototype image showing a picture image framed within a frame. The method includes providing a frame image showing the frame in a perspective view. The frame image has a picture portion corresponding to the portion of the frame used to view a picture mounted in the frame. The method includes mapping the picture image to the picture portion of the frame image in order to generate the frame prototype image. The method includes providing an enhanced edit set along with the frame prototype image. The enhanced edit set includes user manipulatable tools for editing either the picture or the frame in the perspective view.

Aspects of the invention can include one or more of the following features. The method can include identifying a picture portion of the frame image. Identifying the picture portion of the frame image can include providing a mat identifying the picture portion of the frame image. The mat can include a plurality of pixels, each pixel having a pixel value. Identifying the picture portion of the frame image can include setting each pixel in the mat that corresponds to the picture portion of the frame image to a first pixel value. Identifying the picture portion of the frame image can include identifying the outer perimeter of the picture portion of the frame image. The picture portion of the frame image can have a quadrilateral shape and identifying the picture portion of the frame image can include identifying the four corners of the picture portion. The method can include displaying the frame prototype image.

Mapping the picture image to the picture portion of the frame image can include texture mapping the picture image to the picture portion of the frame image. Mapping the picture image to the picture portion of the frame image can include mapping the picture image to the picture portion of the frame image using the illumination of the picture portion of the frame image. The frame image can be captured using a digital camera.

The set can include a cropping tool and the method can include cropping the picture in accordance with user instructions and presenting the cropped picture in the picture portion of the frame image. The enhanced image set can include a border tool and the method can include adjusting the border of the picture in accordance with user instructions and presenting the picture including new border in the picture portion of the frame image.

The enhanced image set can include an effects tool and the method can include applying an effect to the picture in accordance with user instructions and presenting the picture including selected effect in the picture portion of the frame image. The method can include selecting the effect from the group consisting of black & white, soft focus, color tone and saturate. When the effect applied is color tone, the method can further include receiving color tone adjustment data and presenting a color tone adjusted picture in the picture portion of the frame.

The enhanced image set can include a rotation tool and the method can include rotating the frame in accordance with user instructions and presenting the rotated framed in the framed image. Alternatively, the rotation tool can be used to rotate the picture image in the frame in accordance with user instructions. The enhanced image set can include a border tool and the method can include receiving a border width selection, adjusting the border width of the picture image in accordance with the border width selection and presenting the picture image including adjusted border in the framed image. The enhanced image set can include a frame adjustment button and the method can include receiving a frame size selection, changing a size of the frame in the perspective view in accordance with the frame size selection, mapping the picture image to a picture portion of the new size frame and presenting the picture image in the framed image.

The enhanced image set can include a trimming tool and the method can include trimming the picture image in accordance with user instructions and presenting the trimmed picture image in the frame of the framed image. The enhanced image set can include a delight me tool and the method can include activating the delight me tool upon user request, automatically selecting a feature or effect to apply to the framed image, applying the selected feature to the framed image and presenting the framed image. Automatically selecting a feature can include randomly selecting a feature and selecting a feature or effect to apply to the picture image or the frame.

In another aspect, the invention provides a computer program product tangibly embodied in a computer-readable medium, for generating a frame prototype image showing a picture image framed within a frame. The computer program includes instructions operable to cause a computer to receive the picture image, store a frame image showing the frame in a perspective view and a mat identifying the picture portion of the frame image, map the picture image to the picture portion of the frame image in order to generate the frame prototype image and present an enhanced edit set along with the frame prototype image. The enhanced edit set includes user manipulatable tools for editing either the picture or the frame in the perspective view.

In another aspect, the invention provides a system for generating a frame prototype image showing a picture image framed within a frame. The system includes a client computer in communication with a computer network, and a server, in communication with a computer network, having server software embodied in a computer-readable medium. The server software includes instructions operable to cause the server to receive the picture image from the client computer, store a frame image showing the frame in a perspective view and a mat identifying the picture portion of the frame image, map the picture image to the picture portion of the frame image in order to generate the frame prototype image and provide an enhanced edit set along with the frame prototype image. The enhanced edit set includes user manipulatable tools for editing either the picture or the frame in the perspective view. The client computer includes client software embodied in a computer-readable medium.

The client software includes instructions operable to cause the client computer to upload the picture image to the server.

Aspects of the invention can include one or more of the following features.

One or more of the following advantages may be provided. The systems and methods described herein provide a more realistic presentation of an image based product. The image based product can be an image in a frame. Other image based products such as photocards, greeting cards, t-shirts, mugs, and other novelty items can also be displayed using a perspective view that enhances the appeal of the product. The user's perspective frame view can be enhanced by lighting and other effects and displayed in an environment to help simulate the appearance of the image-based product in various settings. The user can apply one or more enhancing features to the image while displayed in the environment. Effects can be applied to the image, producing a resultant image that can be provided in a perspective view in the environment. The framed image can be manipulated to change its position, orientation, or size.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
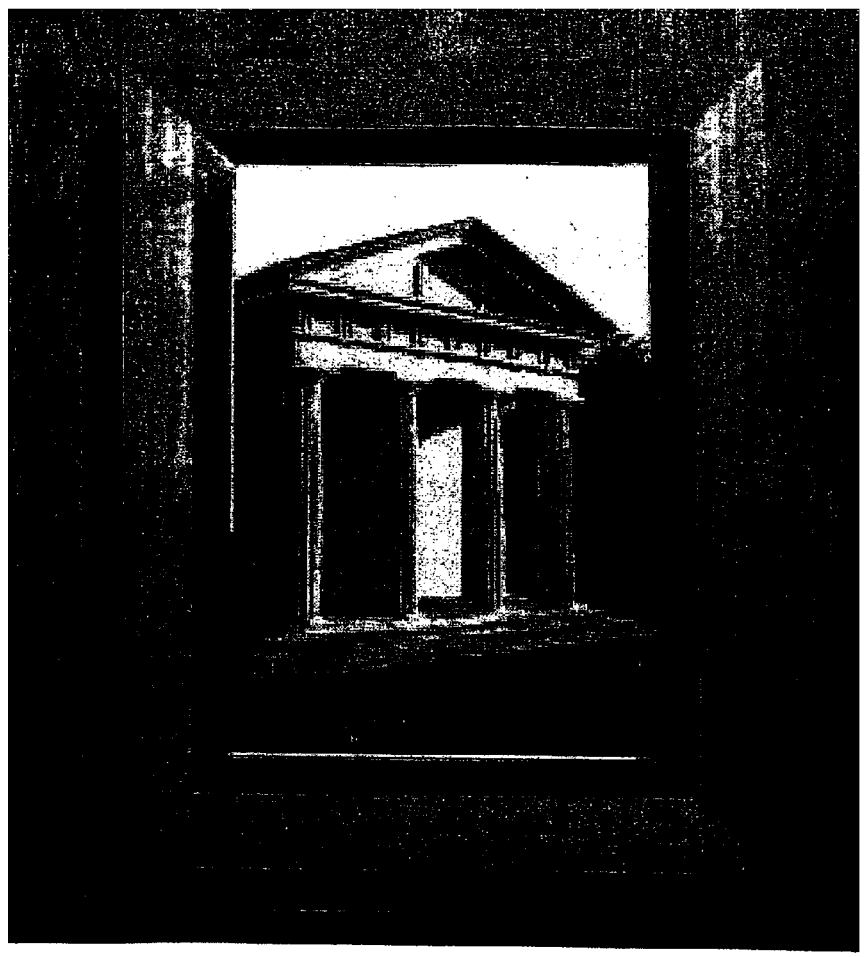
FIG. 1 is an example of a non-perspective frame preview image.
Figure 2:
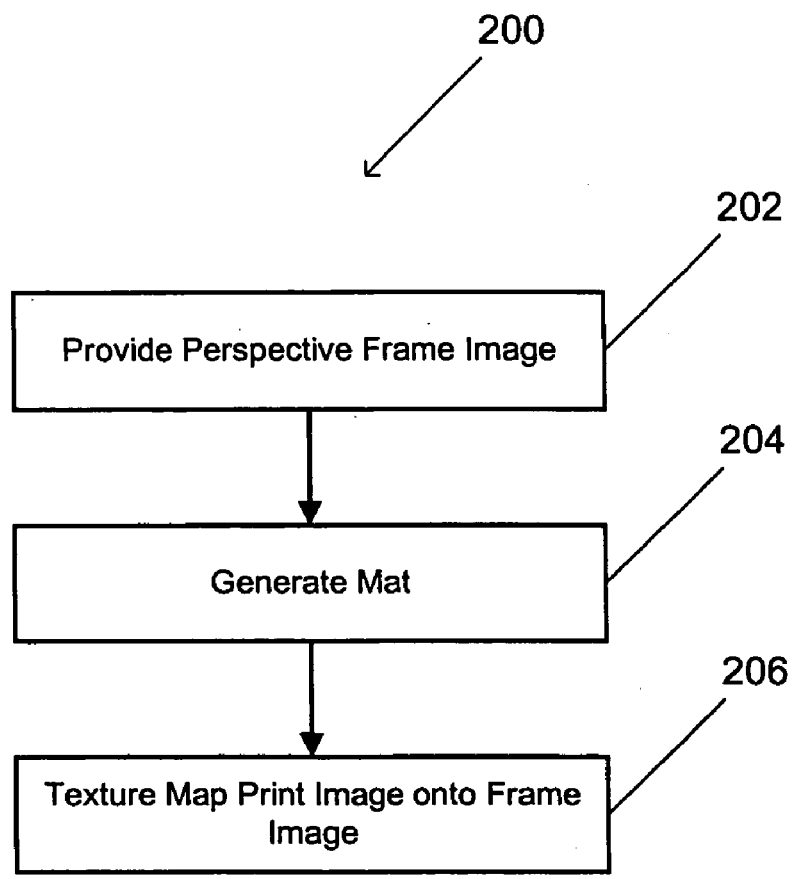
FIG. 2 is a flow diagram of a process of generating a perspective frame preview image showing what a selected picture image would look like mounted in a selected frame.
Figure 3A:
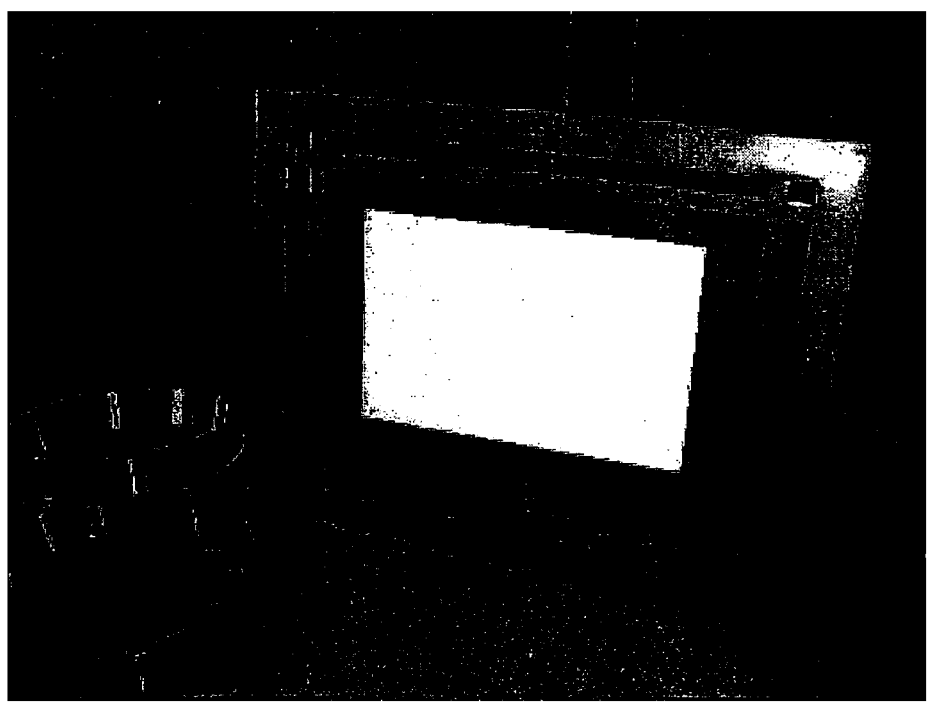
FIGS. 3A–3D show examples of a perspective frame image, mat, print image, and perspective frame preview image, respectively.

FIG. 2 is a flow diagram of a process 200 of generating a perspective frame preview image showing what a selected picture image would look like mounted in a selected frame. The process 200 includes providing a perspective frame image showing the frame in a perspective view (block 202). A "perspective frame image" is an image that shows an in-perspective view of a frame. In other words, the frame in such a perspective frame image is not shown in a head-on view. For example, a frame can be arranged in a typical scene in which the frame might be displayed (e.g., on a table) and then a digital camera can be used to capture a perspective image of the frame as it appears in the scene. Also, a white piece of paper (or other suitable material) can be mounted in the frame where an image print would be displayed. As a result, the perspective frame image will include a white region located where an image print would be visible in the frame (also referred to here as the "picture area"). An example of such a perspective frame image 300 having a picture area 302 is shown in FIG. 3A.

Figure 3B:
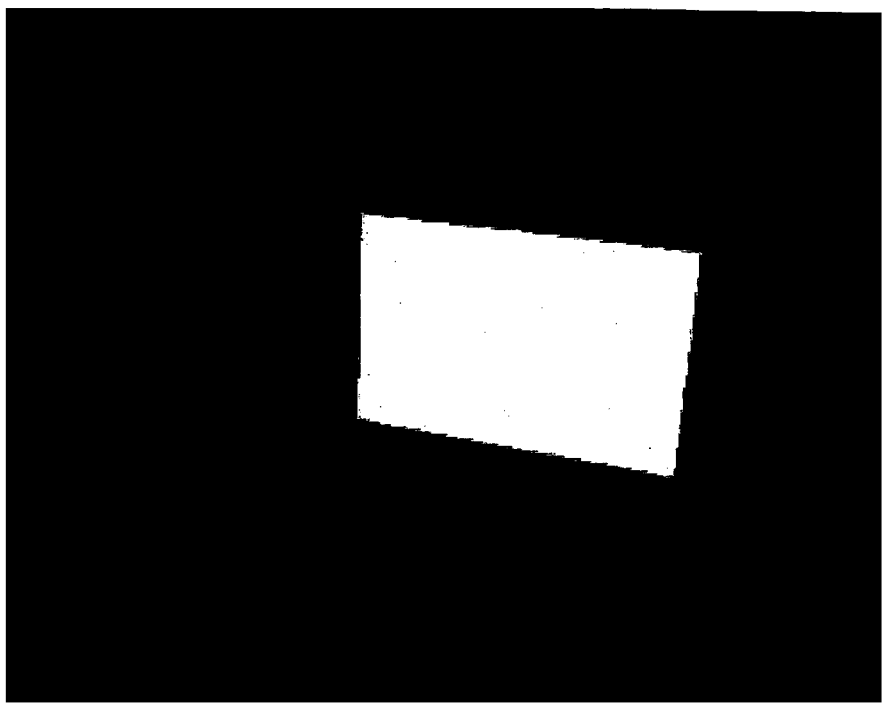

The process 200 also includes generating a mat from the perspective frame image (block 204). The mat is an image that has a corresponding pixel for each pixel in the perspective frame image. In one implementation, each pixel in the mat has one of two values—one value (e.g., a value representing the color white) indicates that the corresponding pixel in the perspective frame image is included in the picture area and the other value (e.g., a value representing the color black) indicates that the corresponding pixel in the perspective frame image is outside of the picture area. For example, the mat can be generated manually using image-processing software such as ADOBE PHOTOSHOP® or the GNU IMAGE MANIPULATION PROGRAM ("the GIMP"). A user can identify the outer boundary of the picture area by inspecting the perspective frame image in order to locate the outer boundary of the white region. For example, if the picture area is a quadrilateral, a user can locate the four corners of the white region, which can be used by the image-processing software to define the picture area. Then, the user can cause the image-processing software to assign the value associated with the color white to those pixels in the mat that correspond to pixels in the picture area. Also, the user can cause the image-processing software to assign the value associated with the color black to those pixels in the mat that correspond to pixels outside of the picture area. An example of such a mat 302 is shown in FIG. 3B.

Figure 3C:
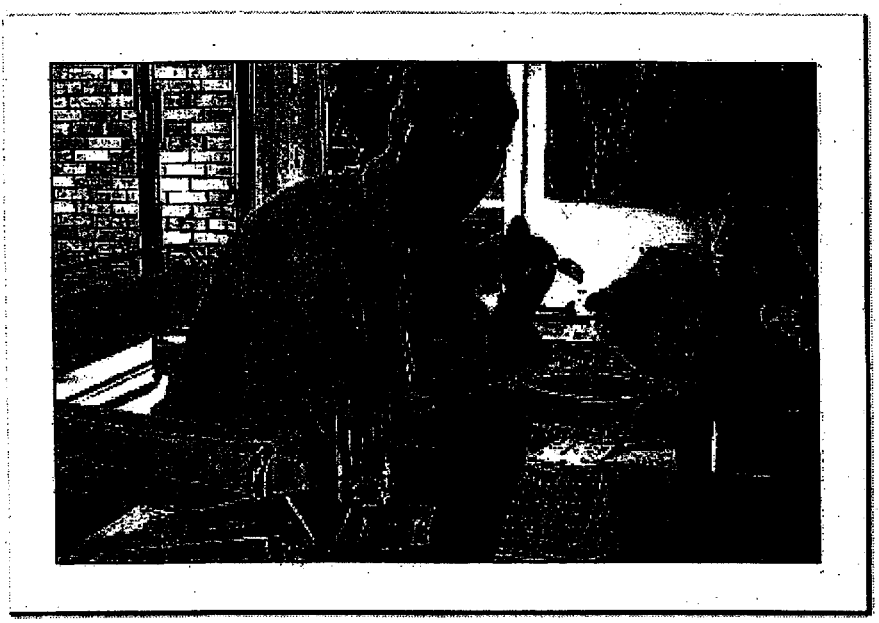
Figure 3D:
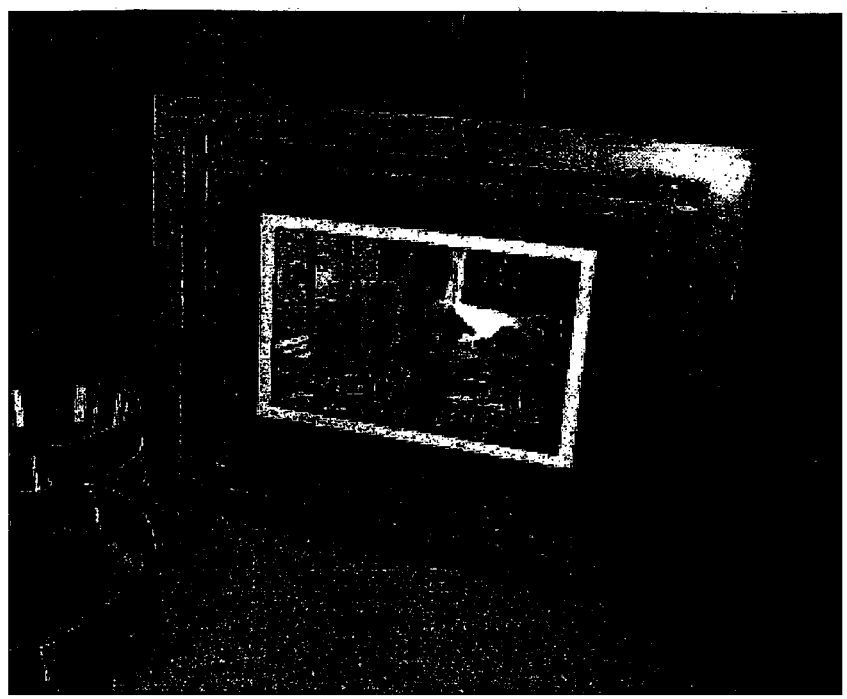

Then, a print image is texture mapped onto the picture area of the perspective frame image (block 206). This creates a perspective frame preview image that shows how the print image will look mounted in the selected frame. In general, texture mapping lays an image (the "texture") onto an object in a scene. When mapping the image onto the object, the color of the object at each pixel is modified by a corresponding color from the image. In this case, the picture image is the "texture" and the picture area is the "object" onto which the texture is mapped. An example of a print image 306 is shown in FIG. 3C, and an example of a perspective frame preview image 308 showing how the print image 306 will look mounted in the frame shown in the perspective frame image 300 is shown in FIG. 3D.

Figure 4:
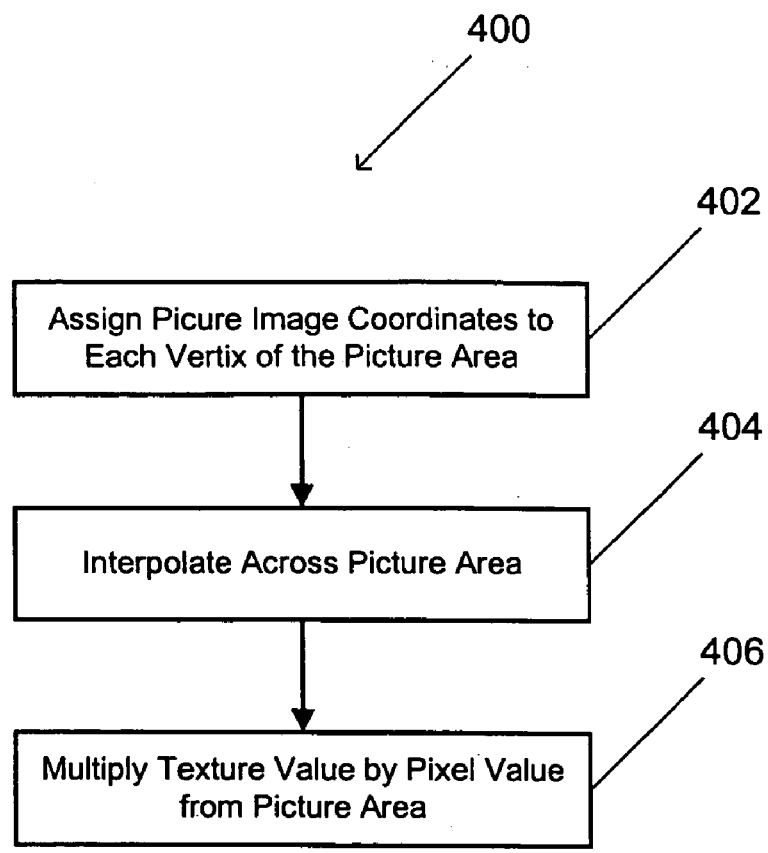
FIG. 4 is a flow diagram of a process of texture mapping a print image onto the picture area of a perspective frame image.

FIG. 4 is flow diagram of a process 400 of texture mapping a picture image onto the picture area of a perspective frame image. First, picture image coordinates are assigned to each of the vertices of the picture area (block 402). The vertices of the picture area can be identified using the mat. For example, coordinates associated with each of the four corners of the picture image can be assigned to respective corners of the picture area. These coordinates index the picture image. Next, the coordinates are interpolated across the polygon to determine, at each of the picture area's pixels, a texture value (block 404). This texture value is then multiplied by the original value of that pixel (block 406). In this way, the illumination of the white piece of paper used in the perspective frame image is used to illuminate the texture-mapped picture image in the final frame preview image. This tends to cause the resulting frame preview image to look more realistic. For example, reflections caused by glass that typically covers a framed image print tend to reduce the contrast of the image print when viewed through the glass. Multiplying the texture value by the original value of the pixel reduces the contrast of the texture-mapped picture image in a manner that reproduces this effect.

Figure 5:
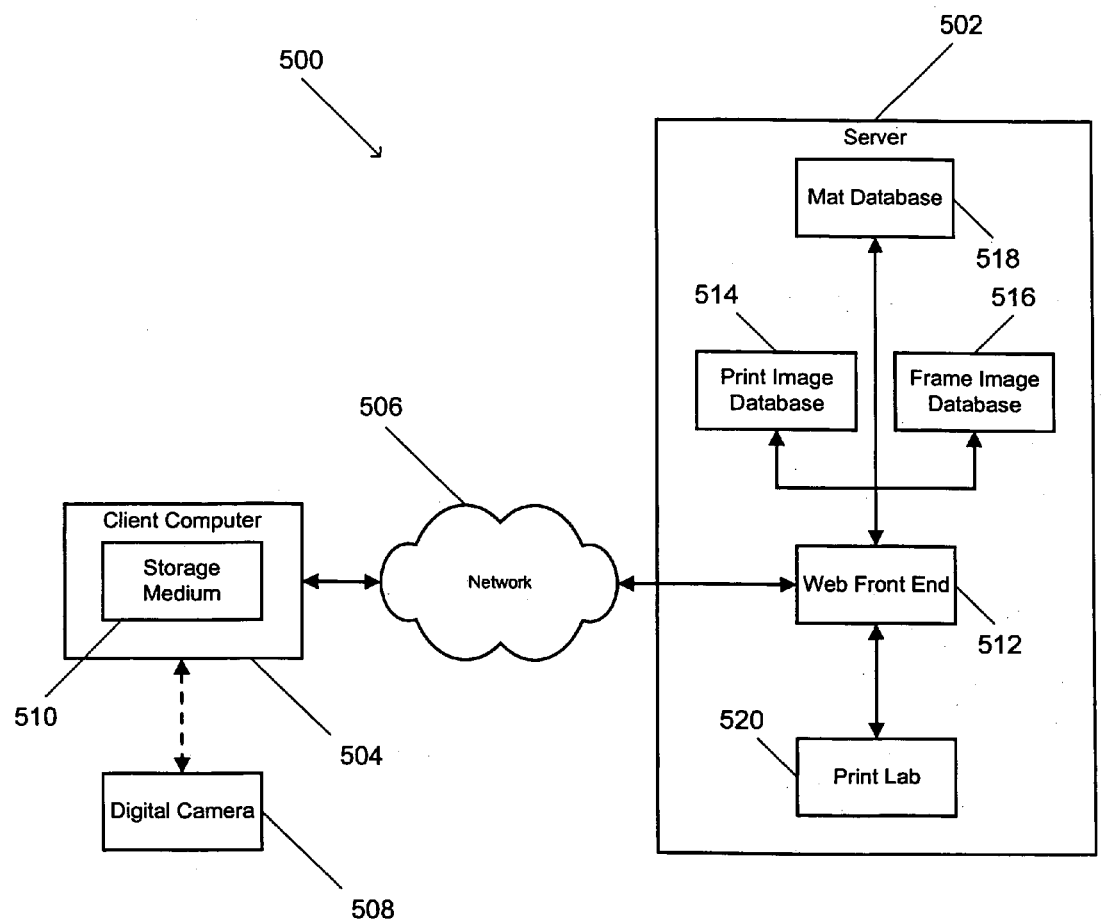
FIG. 5 is a block diagram of system that can be used to generate perspective frame preview images.

One implementation of a system 500 for generating perspective frame preview images is shown in FIG. 5. System 500 includes a server 502 that is connected to one or more client computers 504 by a network 506 such as the Internet. The client computers 504 can be connected to a digital camera 508 so that a user can upload captured digital images from the digital camera 508 to the client computer 504. Alternatively, or in addition, the client computer 504 can execute image processing software such as ADOBE PHOTOSHOP® or the GNU IMAGE MANIPULATION PROGRAM ("the GIMP") in order to create and/or edit digital images. The client computer 504 includes a storage medium 510 such as a hard disk for storing the digital images. The client computer 504 can be implemented using a variety of hardware and software. For example, the client computer 504 can be a general-purpose device such as a personal computer, portable computer, or portable digital assistant ("PDA") or as a special-purpose device such as a point-of-sale kiosk having an embedded computer.

The client computer 504 is connected to the network 506, for example, using a modem or network interface card. The system 500 can be implemented as a browser-based system in accordance with the standard protocols for communicating over the Word Wide Web. In such an implementation, a user of the client computer 504 can execute a browser to connect to and interact with the server 502. The server 502 includes a web front end 512 that manages the communications with the client computer 504. The user of the client computer 504 can upload digital images (that is, print images) to the server 502. The web front end 512 receives the uploaded digital images and stores them in a print image database 514.

The server 502 also includes a perspective frame image database 516 and a mat database 518 for storing, respectively, perspective frame images and associated mats. Several different perspective frame images and associated mats can be prepared and stored in the perspective frame image database 516 and the mat database 518 so that a user of the client computer can generate one or more perspective frame preview images with one or more selected print images.

After viewing one or more perspective frame preview images, the user of the client computer 504 can order a selected image print mounted in a selected frame. The server 502 includes, or is connected to, a print lab 520. The print lab 520 receives the user's selection of a print image and generates an image print from the selected print image. The print lab 520 can include appropriate facilities for mounting the image print in the selected frame. In addition, the print lab 520 can generate other image-based products. For example, the print lab 516 can print or otherwise embody the selected images in other items such as clothing, buttons, mugs, cards, invitations, and calendars. The items generated by the print lab 520 can be shipped to the user using a conventional shipping service such as the UNITED STATES POSTAL SERVICE or FEDERAL EXPRESS®. Commonly assigned co-pending U.S. patent applications Ser. No. 09/428,871 (entitled "MULTI-TIERED IMAGE DATABASE" and filed Oct. 27, 1999), Ser. No. 09/436,704 (entitled "DISTRIBUTING IMAGES TO MULTIPLE RECIPIENTS" and filed Nov. 9, 1999), and Ser. No. 09/450,075 (entitled "PRINTING IMAGES IN AN OPTIMIZED MANNER" and filed Nov. 29, 1999), all of which are incorporated herein by reference, disclose various approaches to implementing a system 500 for generating image-based products from digital images.

Figure 6A:
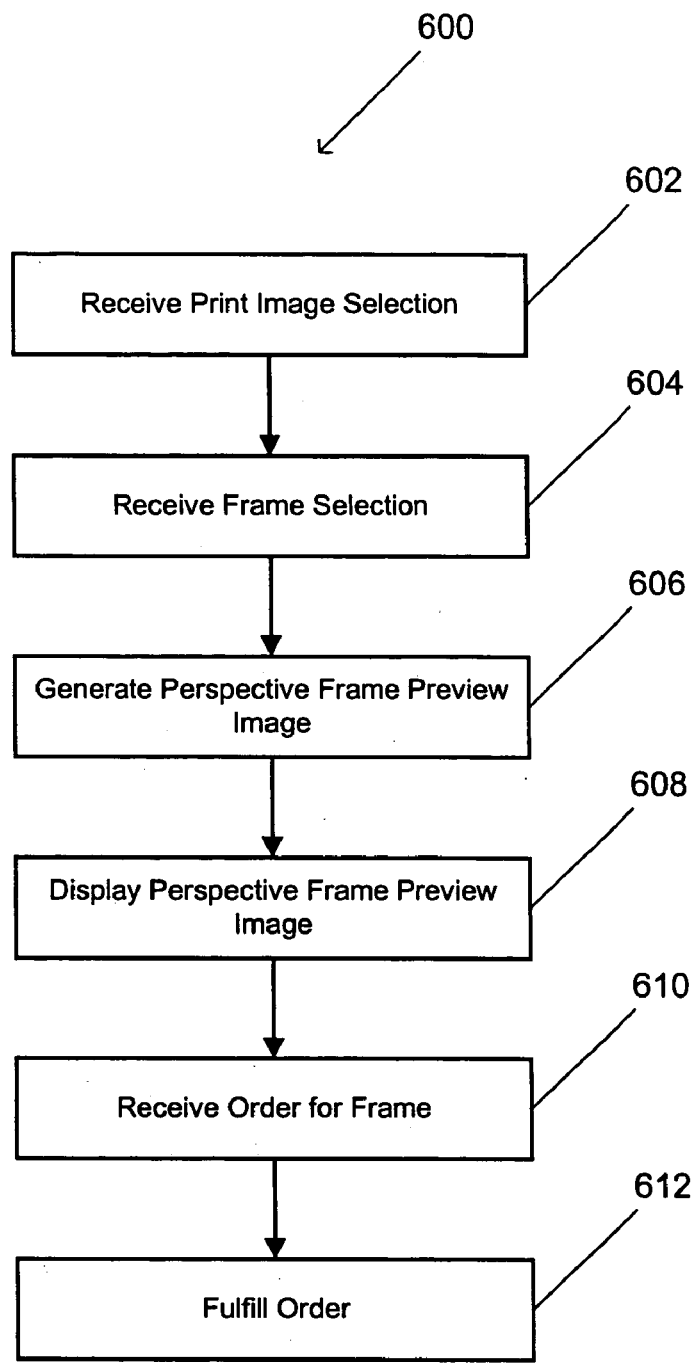
FIG. 6A is flow diagram of a process of providing a perspective frame preview image over a computer network such as the Internet.
Figure 7A:
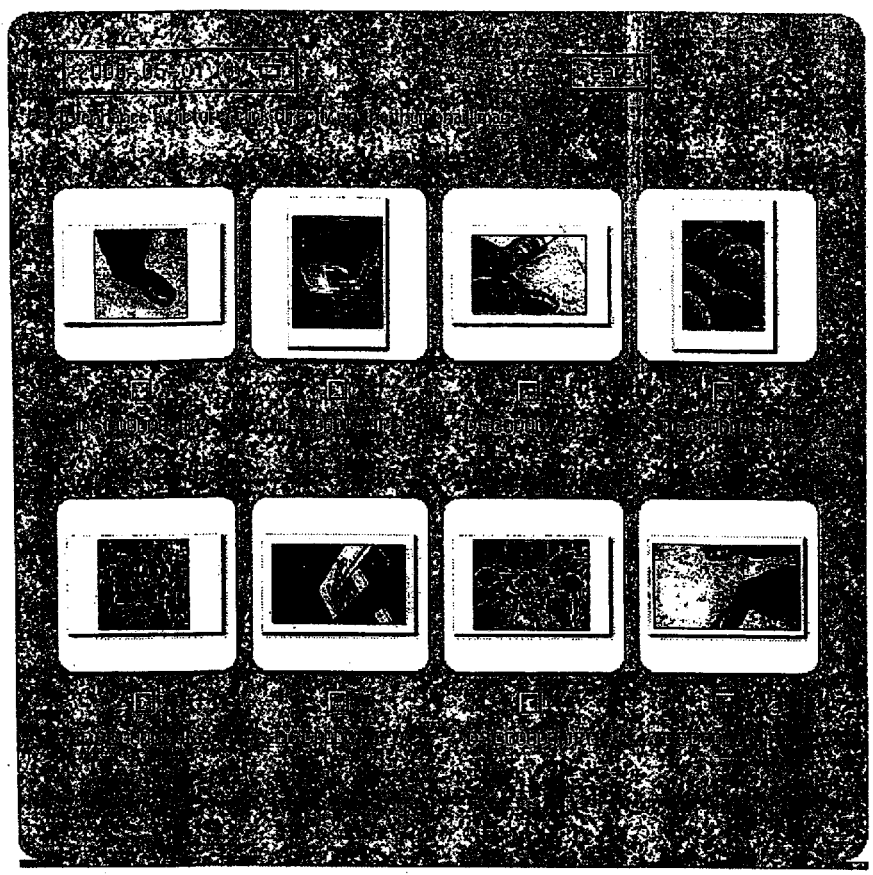
FIGS. 7A–7C are example screens displayed during the process shown in FIG. 6A.

FIG. 6A is flow diagram of a process 600 for providing a perspective frame preview image over a computer network such as the Internet. The process 600 includes receiving a print image selection (block 602). The print image selection can be received, for example, over the Internet. The user can upload one or more print images to the server 502 (where they are stored in the print image database 514) and select a print image from those print images stored in the print image database 514. For example, web front end 512 can generate and transmit to the browser a web page 700 (shown in FIG. 7A) that includes thumbnail images 702 of one or more print images stored in the print image database 514 (e.g., print images the user has previously uploaded to the server 502). In one embodiment, the user can select one of the print images by clicking on the thumbnail image 702 associated with the selected print image.

Figure 7B:
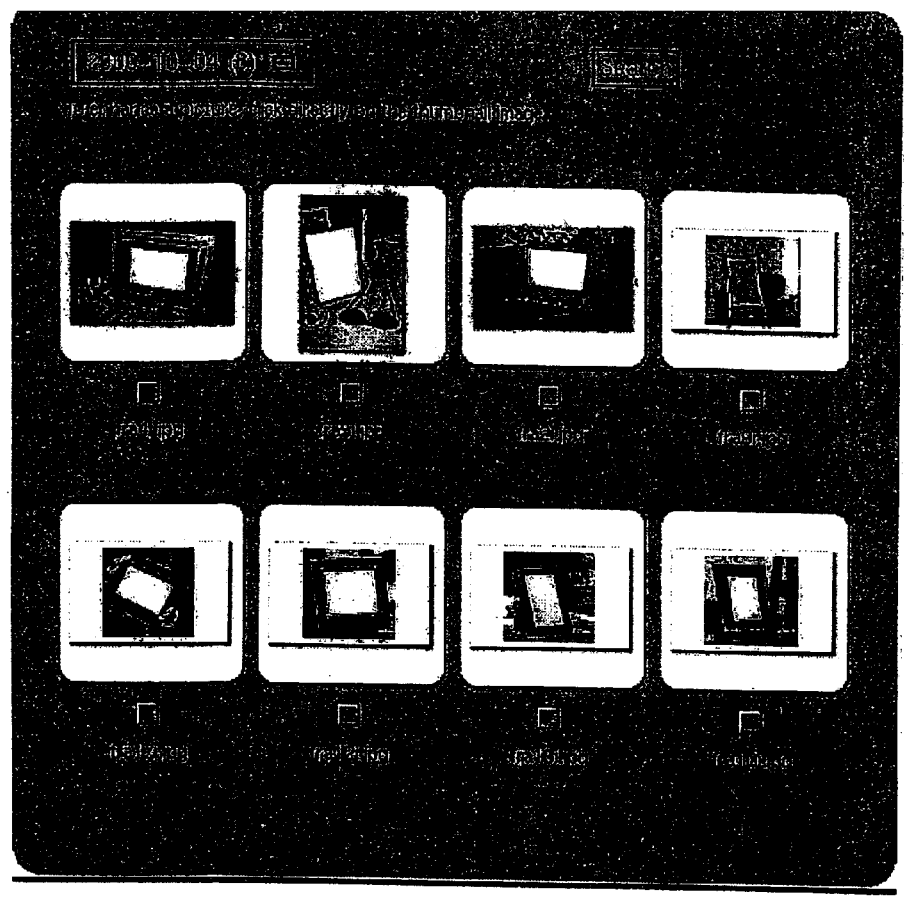

The process 600 also includes receiving a frame selection (block 604). For example, the web front end 512 can supply to the browser a web page 704 (shown in FIG. 7B) including thumbnail images 706 of one or more frames from which the user can chose. In one embodiment, the user selects a frame by clicking on the thumbnail image 706 associated with the selected frame.

Process 600 also includes generating a perspective frame preview image in which the selected print image is shown mounted in the selected frame (block 606 shown in FIG. 6A). The print image can be retrieved from the print image database 514, the perspective frame image for the selected frame can be retrieved from the perspective frame image database 516, and the mat associated with the selected frame can be retrieved from the mat database 518. Then, the perspective frame preview image can be generated, for example, in accordance with the process 200 shown in FIG. 2.

Figure 7C:
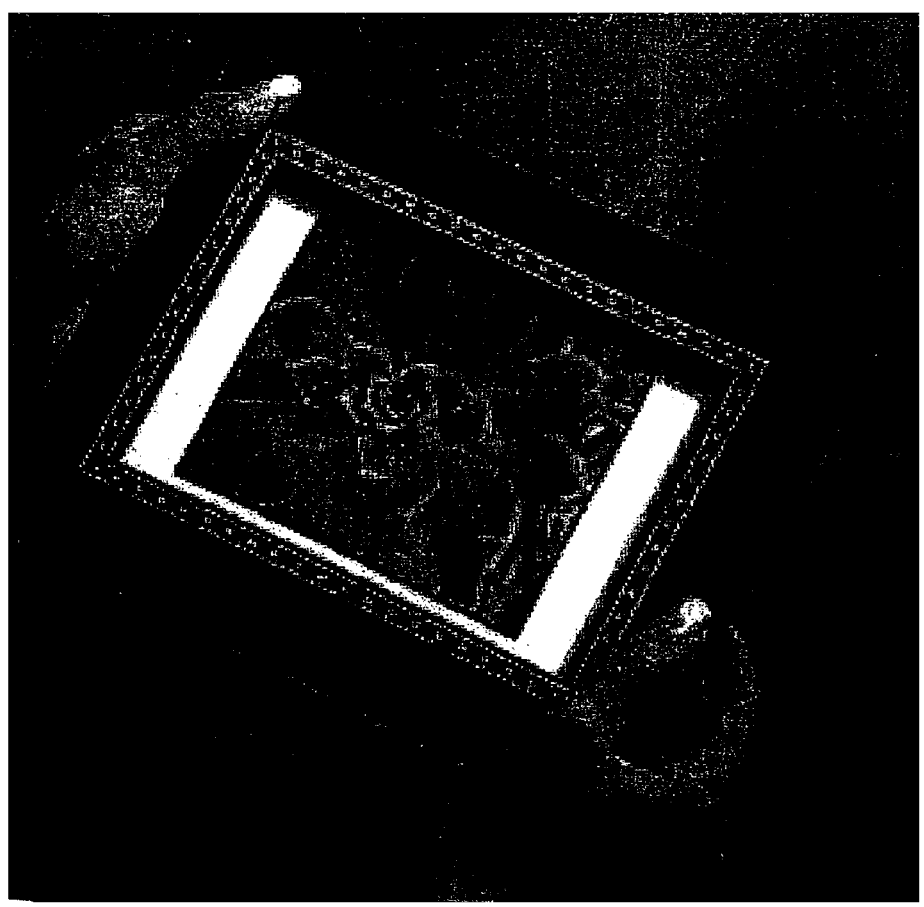

Process 600 also includes displaying the perspective frame preview image (block 608 shown in FIG. 6A). For example, the web front end 512 can generate a web page including the perspective frame preview image and transmit it to the browser executing on the client computer 504. The browser then displays the perspective frame preview image for the user. An example of a web page 708 including a perspective frame preview image 710 is shown in FIG. 7C.

Then, an order for a framed image print can be received (block 610). For example, the framed image print can be produced by the print lab 520. The print lab 520 can receive the user's selection of an print image and frame, generate an image print from the selected print image, and mount the print image in the selected frame. Then the framed image print can be shipped to the user (block 612).

Figure 6B:
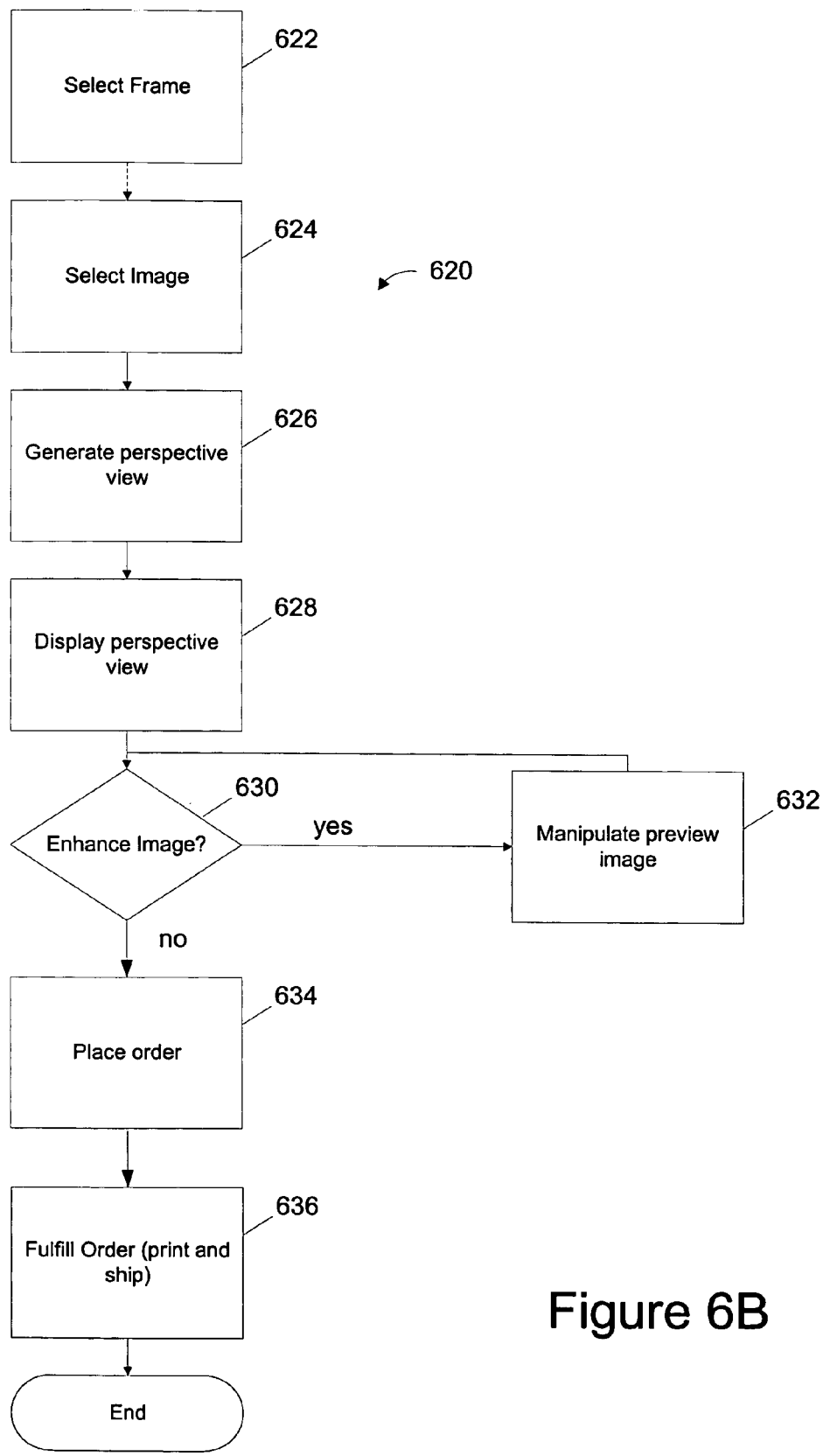
FIG. 6B is a flow diagram of an alternative process of providing a perspective frame preview image over a computer network such as the Internet.
Figure 7D:
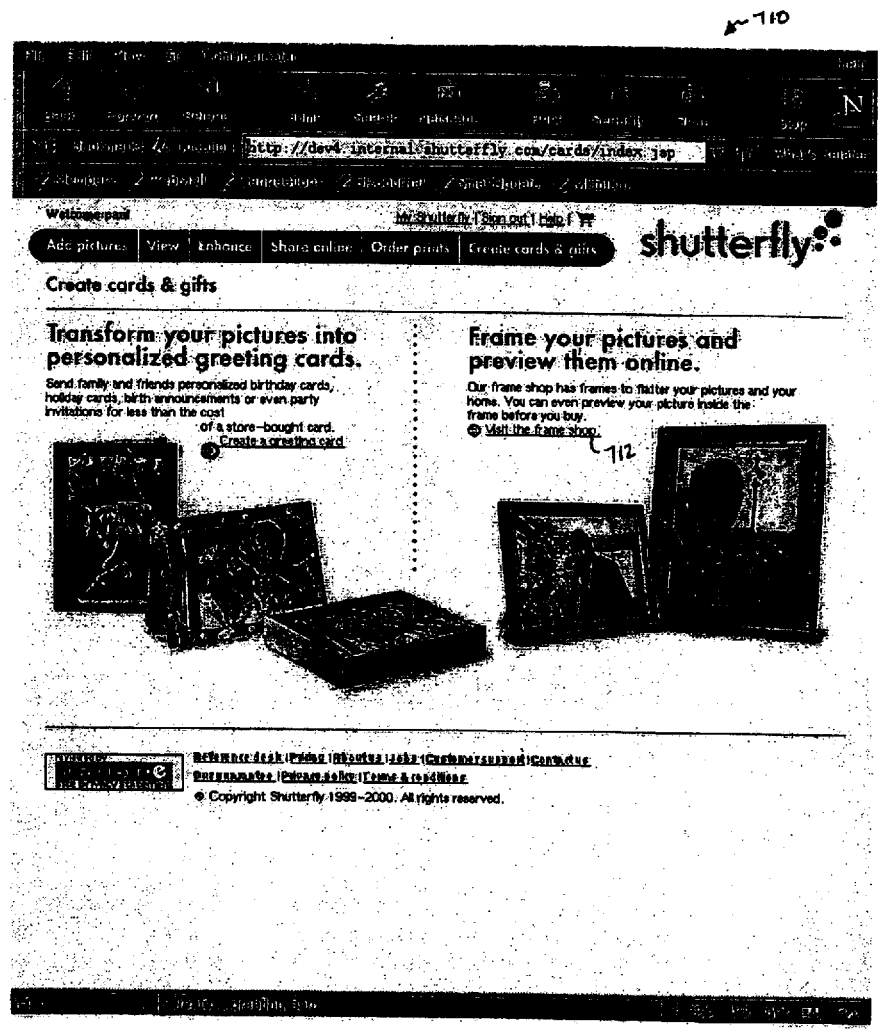
FIGS. 7D–7Q are example screens displayed during the process of FIG. 6B

FIG. 6B is flow diagram of an alternative process 620 for providing a perspective frame preview image over a computer network such as the Internet. The process is described in conjunction with several web pages shown in FIGS. 7D–Q. Each web page can be generated by web front end 512 and be transmitted to the browser of the respective client user. The process 620 includes selecting a frame (block 622).

Figure 7E:
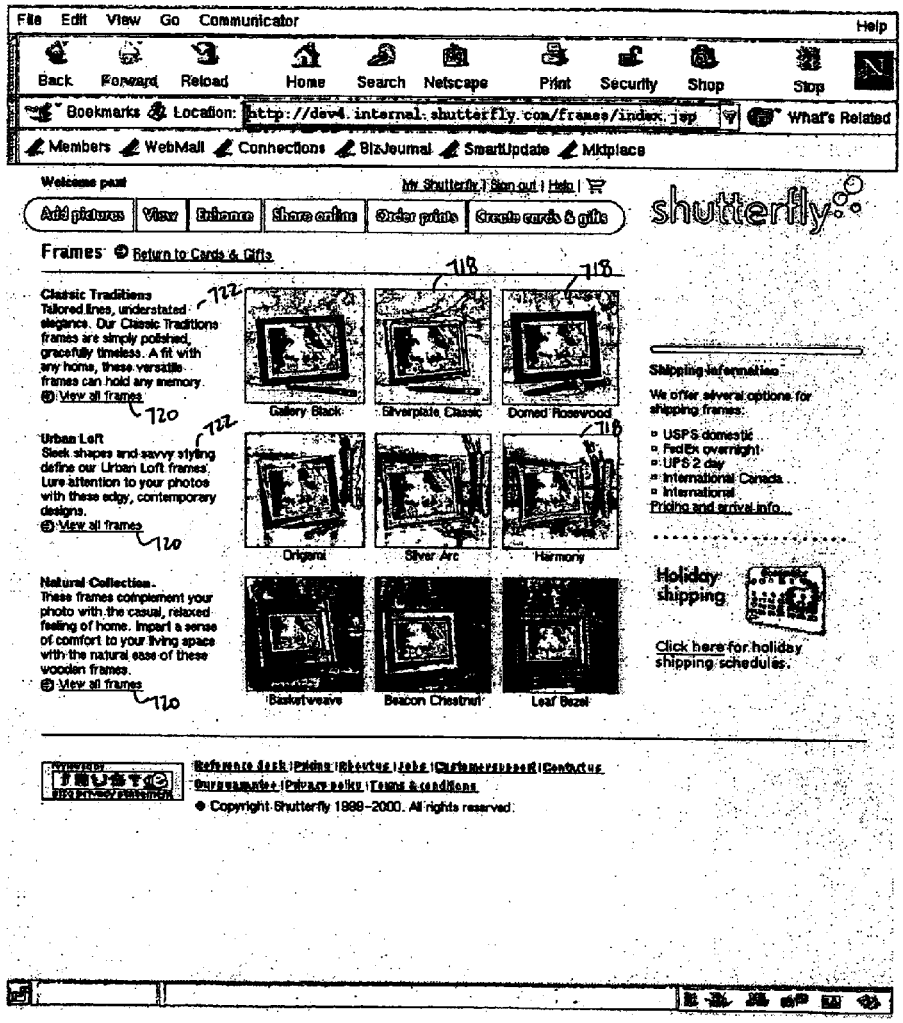
Figure 7F:
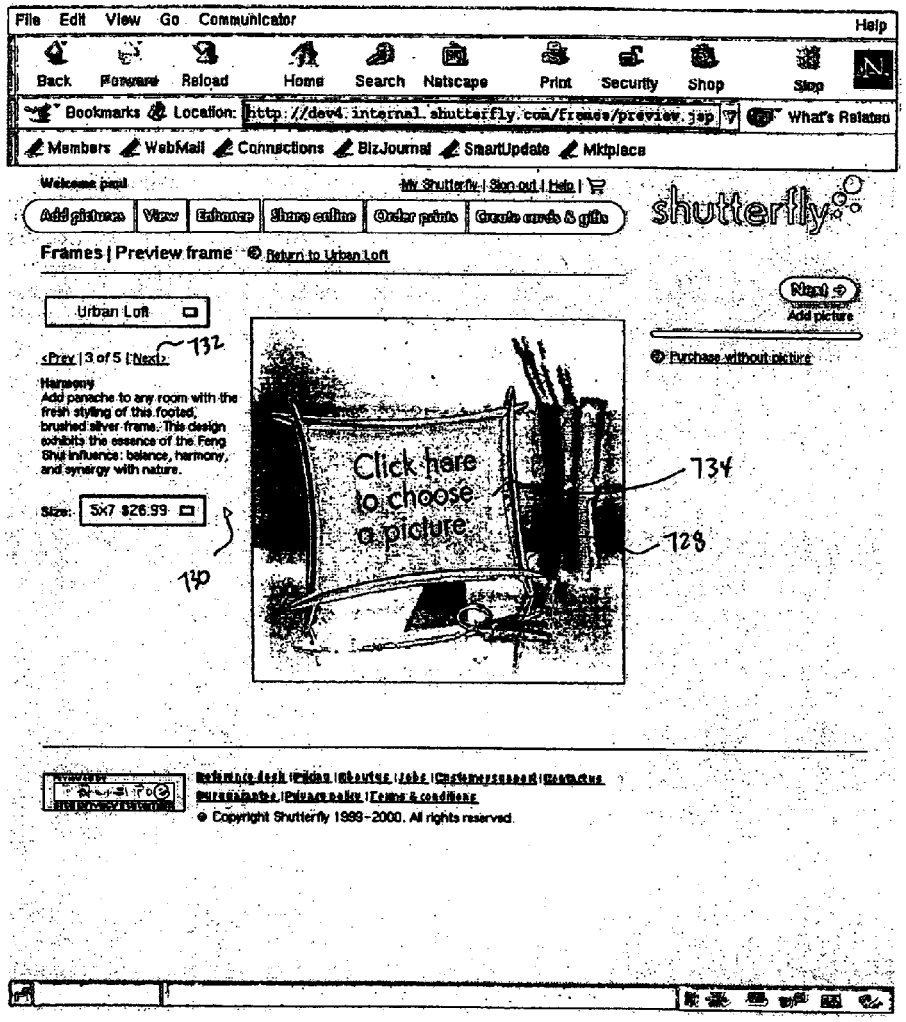

For example, web front end 512 can generate and transmit to the browser a web page 710 (shown in FIG. 7D) that includes a frame and greeting card section of a website hosted by the online photo-finishing service (server 502). The frame selection section includes a link 712 to a catalog of frames. The first page in the catalog (716 of FIG. 7E) includes individual frame selections 718 and links 720 for traversing the pages/sections of the catalog. In one implementation, the catalog can be divided into sections, with quick links to each section. Each section can be described by a textual entry 722 on the first page. The user can select from one of the available frames and, thereafter, is presented with a perspective view of the selected frame (726 of FIG. 7F). In one embodiment, the user selects a frame by clicking on the thumbnail image 706 associated with the selected frame. The perspective view includes the selected frame 728 and a description 730. Links 732 can be included for traversing to other entries (frames) in the catalog. The frame includes a preview portion 734 for displaying an image.

Figure 7G:
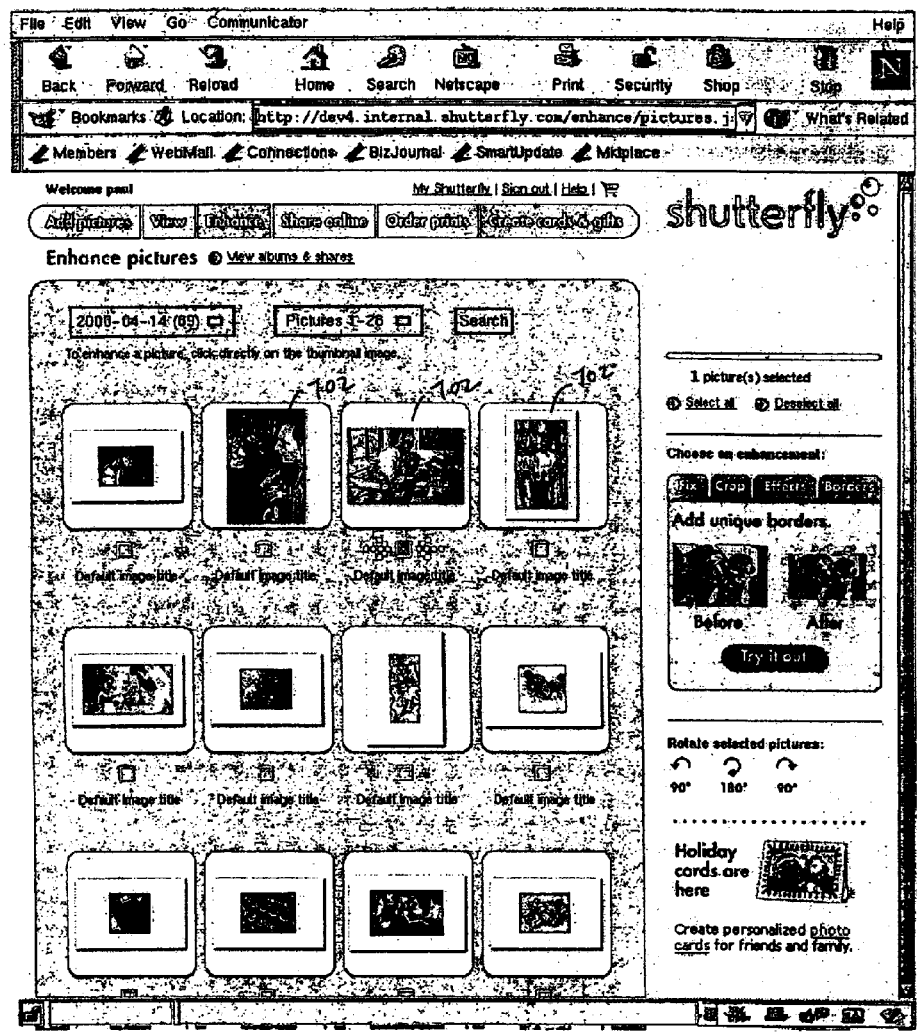

The process continues by selecting an image to be displayed in the frame (624). The print image selection can be received, for example, over the Internet. The user can upload one or more print images to the server 502 (where they are stored in the print image database 514) and select a print image from those print images stored in the print image database 514. By selecting the preview portion, the web front end 512 can generate and transmit to the browser a web page 738 (shown in FIG. 7G) that includes thumbnail images 702 of one or more print images stored in the print image database 514 (e.g., print images the user has previously uploaded to the server 502). In one embodiment, the user can select one of the print images by clicking on the thumbnail image 702 associated with the selected print image.

Process 600 also includes generating a perspective frame preview image in which the selected print image is shown mounted in the selected frame (block 626 shown in FIG. 6B). The print image can be retrieved from the print image database 514, the perspective frame image for the selected frame can be retrieved from the perspective frame image database 516, and the mat associated with the selected frame can be retrieved from the mat database 518. Then, the perspective frame preview image can be generated, for example, in accordance with the process 200 shown in FIG. 2.

Figure 7H:
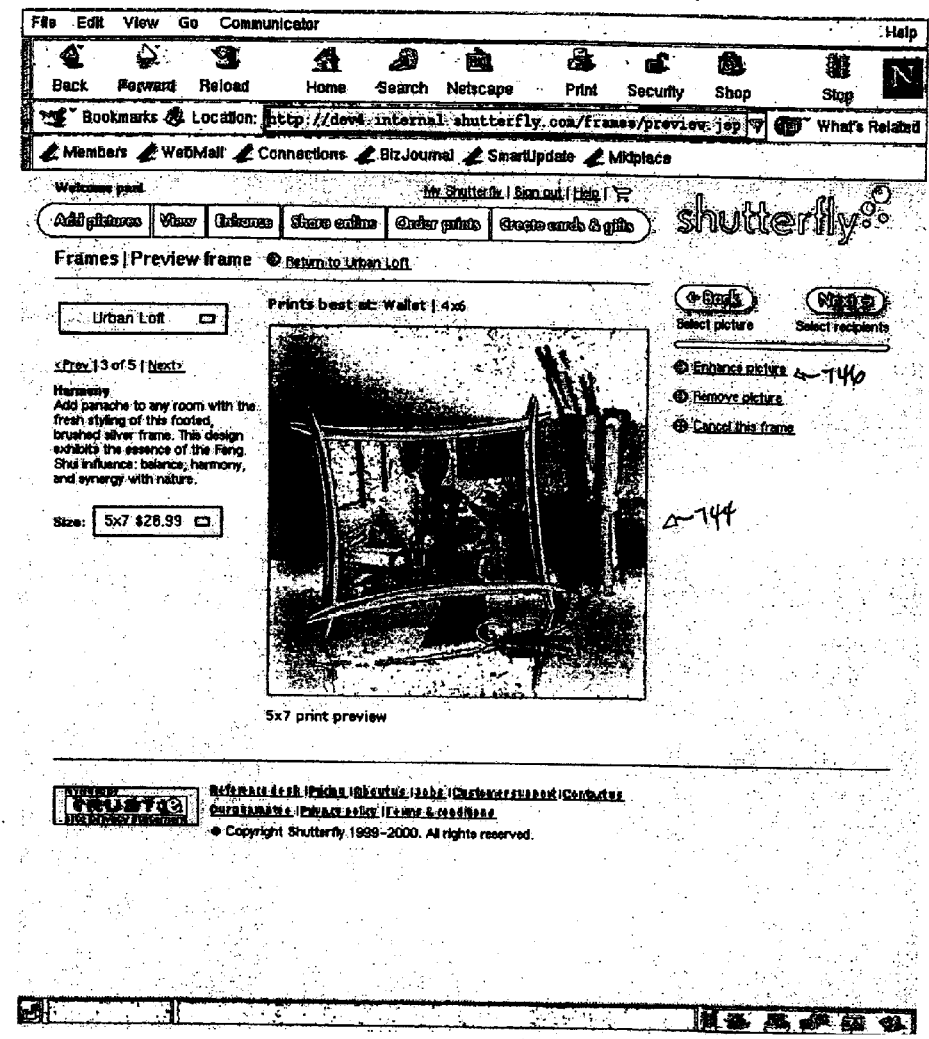

Process 600 also includes displaying the perspective frame preview image (block 628 shown in FIG. 6B). For example, the web front end 512 can generate a web page including the perspective frame preview image and transmit it to the browser executing on the client computer 504. The browser then displays the perspective frame preview image for the user. An example of a web page 742 including a perspective frame preview image 744 is shown in FIG. 7H. Web page 742 includes a link 746 to an enhanced editing page. The enhanced editing page allows the user to manipulate the image or the frame to apply various effects, color transitions and other features to produce different results.

Figure 7I:
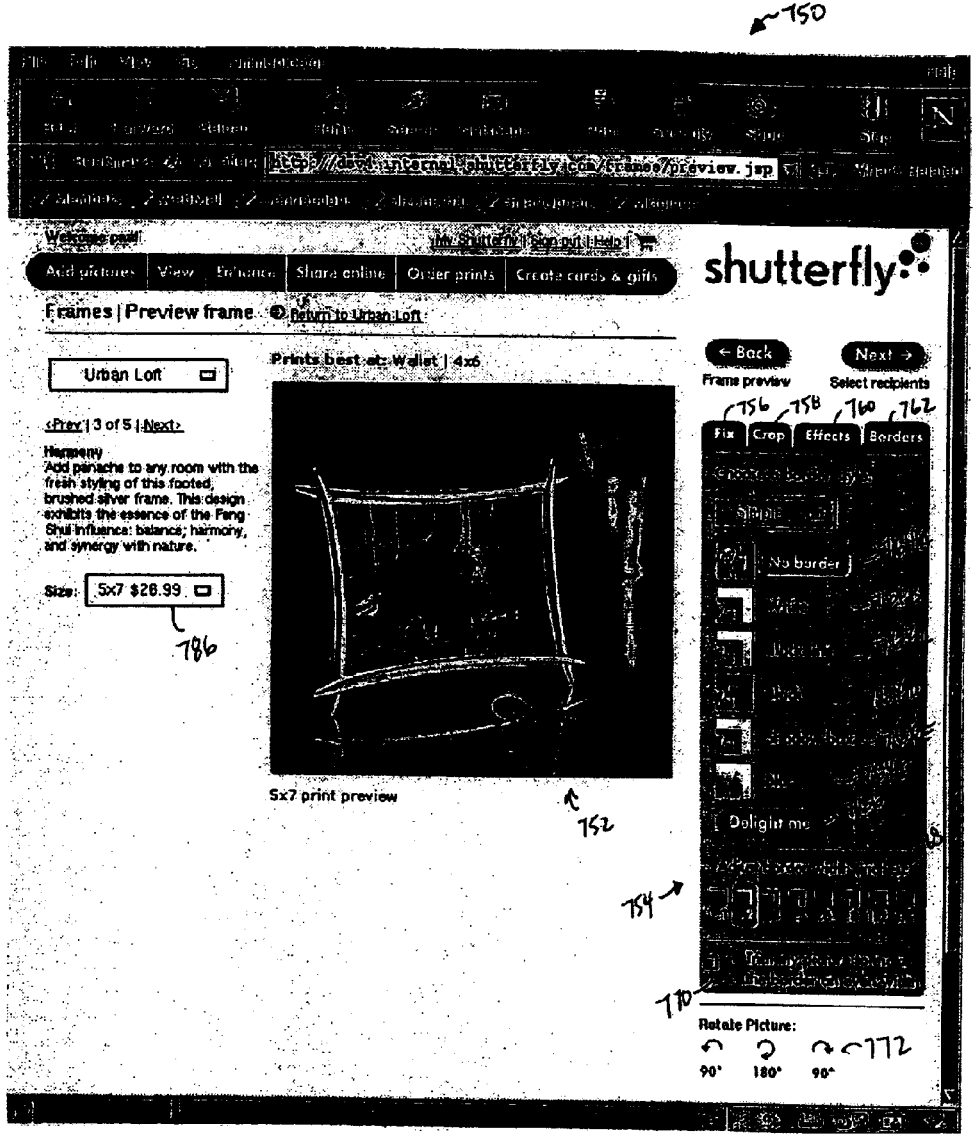

The web front end 512 can generate a web page including the perspective frame preview image and an enhanced edit feature set and transmit it to the browser executing on the client computer 504. The browser then displays the perspective frame preview image with enhanced edit feature set. An example of a web page 750 that includes a perspective frame preview image 752 and an enhanced edit feature set 754 is shown in FIG. 7I.

Enhanced edit feature set 754 includes one or more tab selections (fix tab 756, crop tab 758, effects tab 760 and borders tab 762 in the example shown), one or more feature selections 764, a delight me button 766, a border adjustment tool 768, trim command 770 and a rotation tool 772.

Figure 7J:
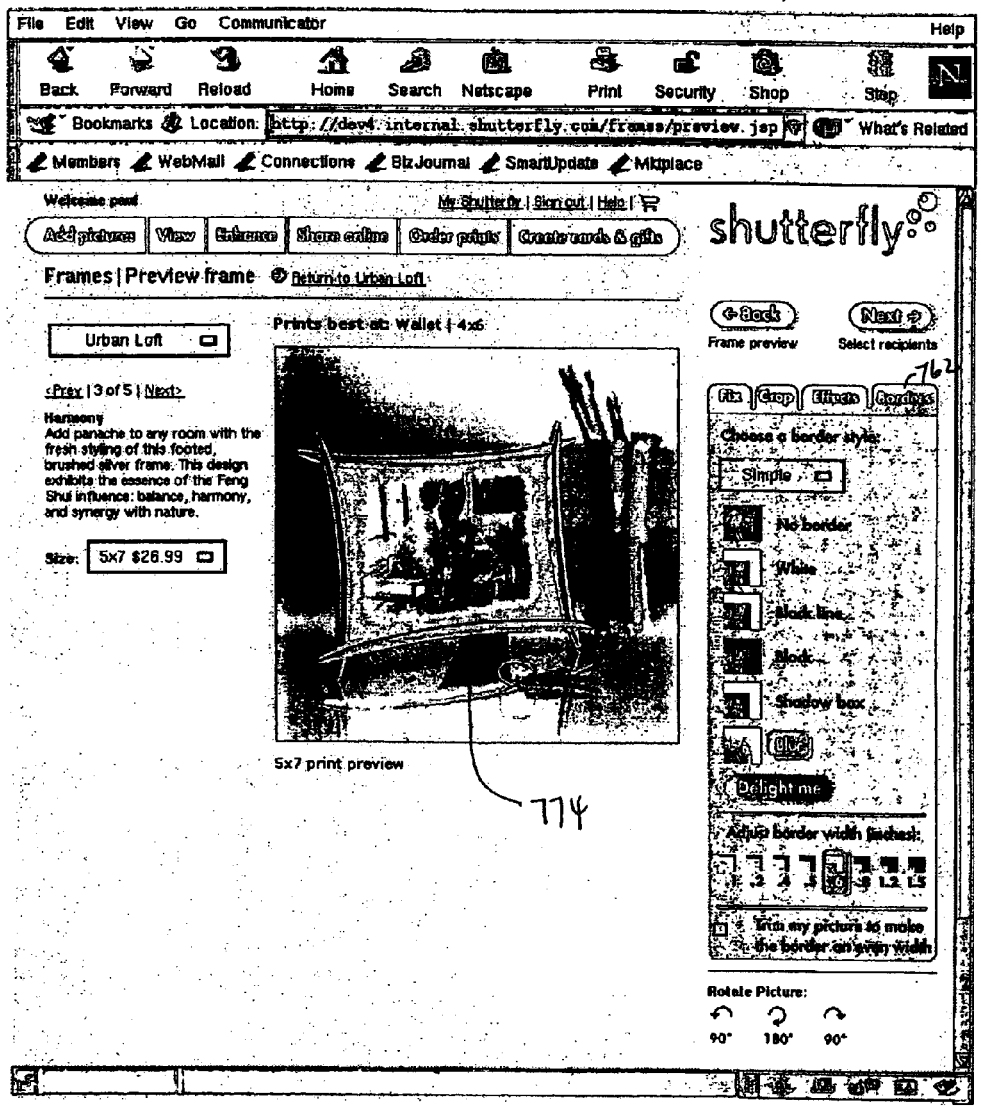
Figure 7K:
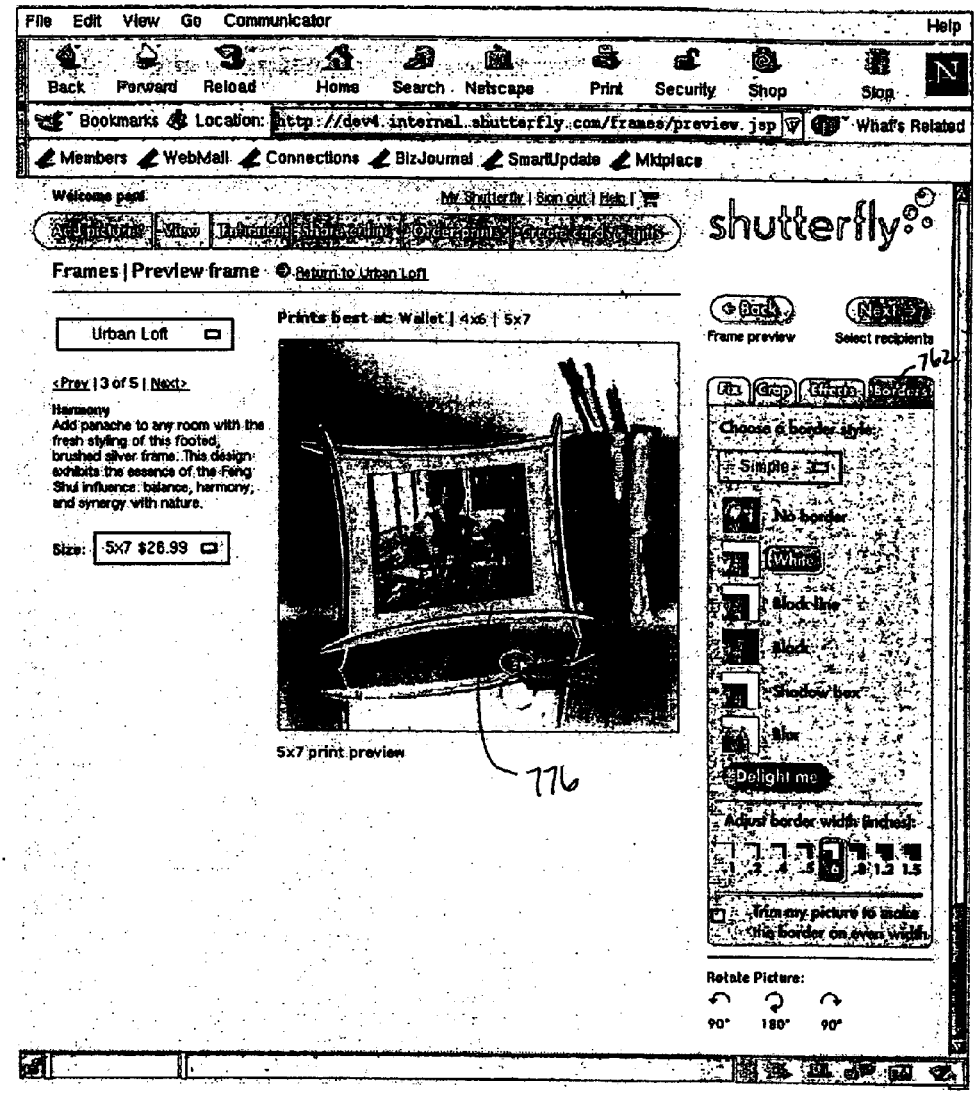

Each tab can include one or more feature selections (764A–F) available to be selected for the respective tab. In the example shown, the borders tab 762 includes 6 feature selections 764 that can be chosen from by the user. Each selection chosen by the user results in the manipulation of the preview image presented to the user. For example, by selecting the blur selection 764 under the borders tab 762, a preview image is generated that includes a blurred edge in the selected frame. An example of the preview image presented when the blur features is selected is shown in FIG. 7J. Web front end 512 can generate a web page 773 including the perspective frame preview image 774 after the application of the selected feature (blur feature 764F). The web page 773 includes the enhanced edit feature set 754. FIG. 7K shows an example of a web page 775 including perspective preview image 776 after the application of the white border feature 764B.

Figure 7L:
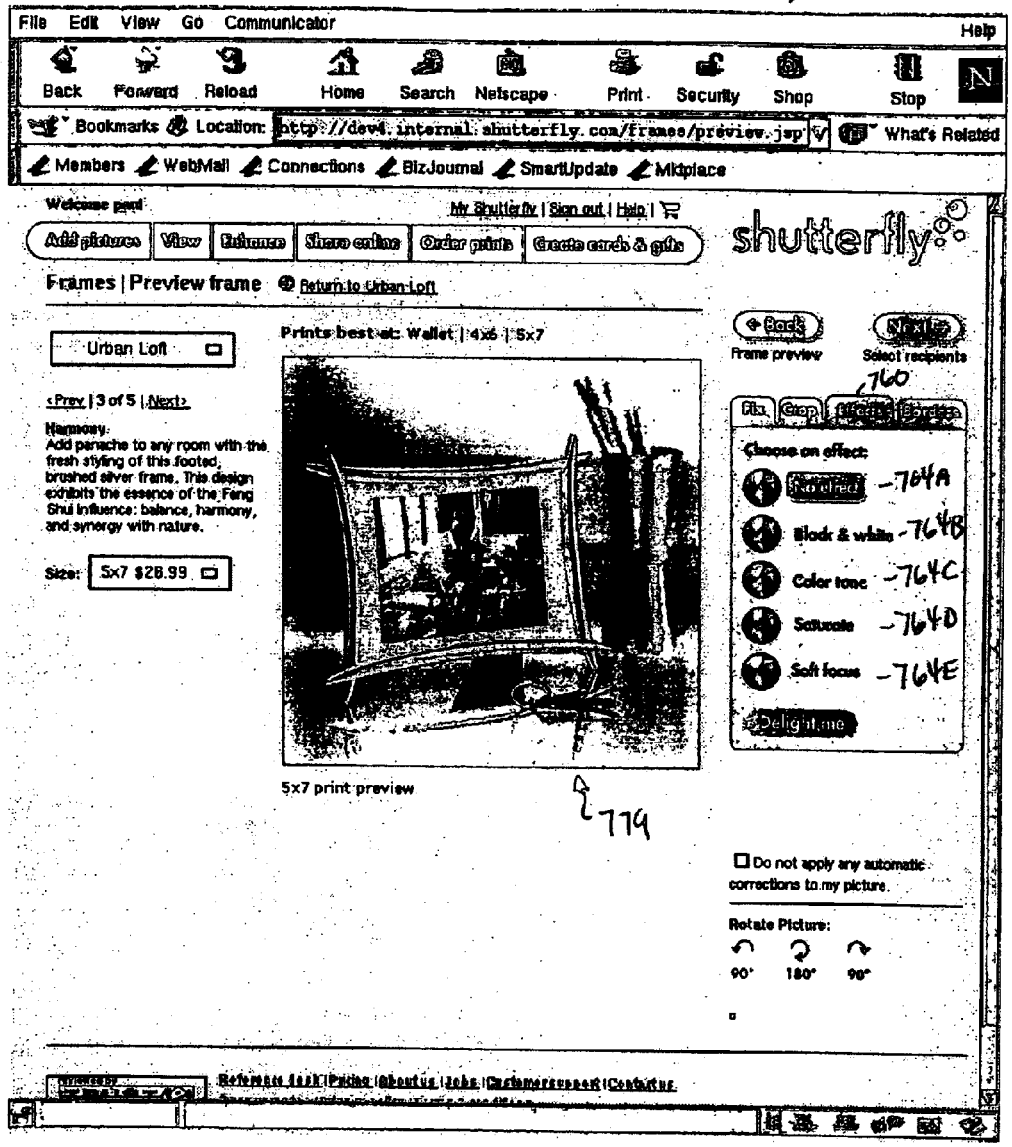
Figure 7M:
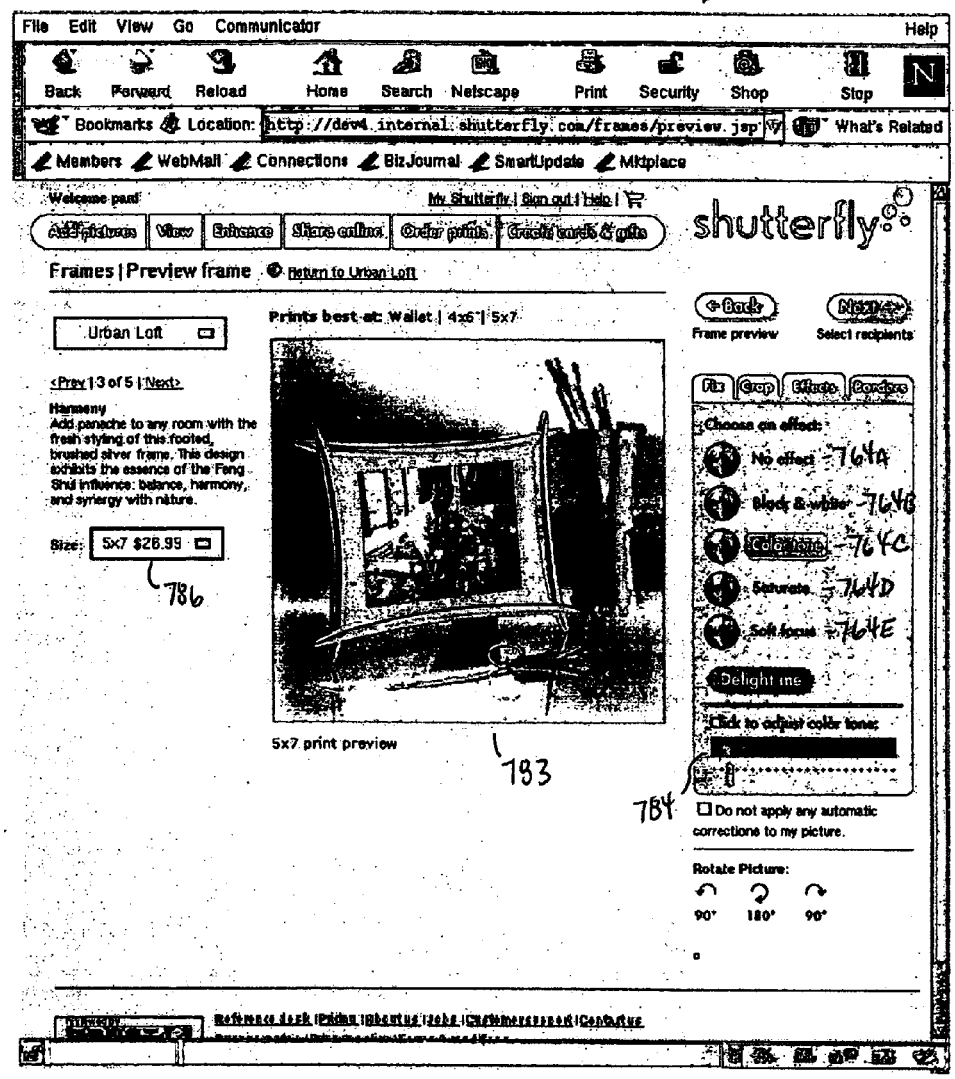

In the example shown in FIG. 7L, the effects tab 760 includes 5 feature selections 764 that can be chosen from by the user. Each selection chosen by the user results in the manipulation of the preview image presented to the user. For example, by selecting the no effect selection 764A under the effects tab 760, a web page 778 that includes a preview image 779 in the selected frame is generated that includes no effects. FIG. 7M shows an example of a web page 782 including perspective preview image 783 after the application of the color tone feature 764C. Associated with each feature can be one or more tools. Each tool can be manipulated to produce the desired effect. In the example shown, a color bar 784 is included in the web page 782. The user can adjust the color bar 784 to adjust the color tone for the image. The server 502 can adjust the color tone, generate a preview image that includes the color-adjusted image and transmit the image back to the user that includes the preview image.

Figure 7N:
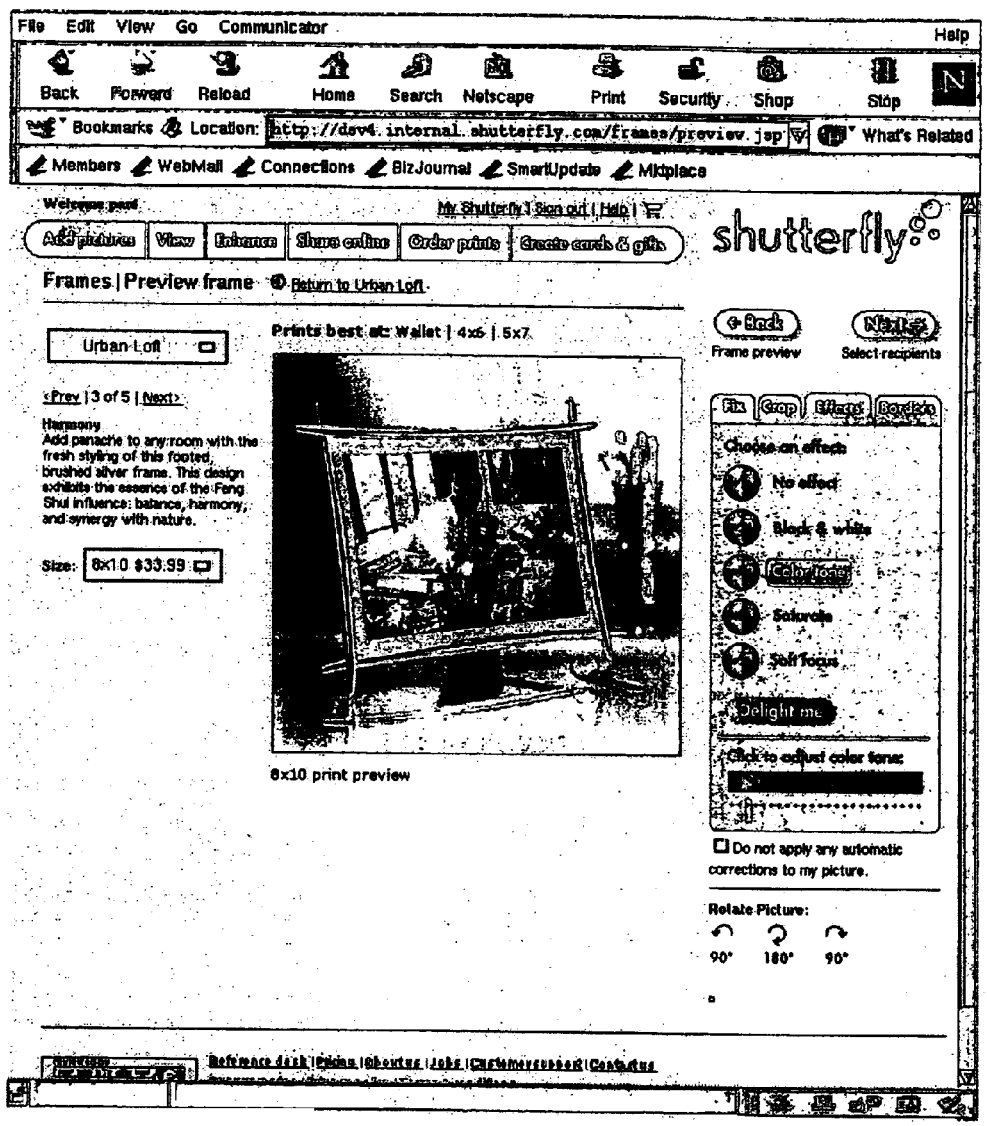

Referring again to FIG. 7I, web page 750 can include a size description button 786. The size description button 786 can include price data for the indicated size of the selected frame. Toggling the size selection button 786 results in server 502 selecting a different size frame, generating a preview image that includes the image correctly sized to fit in the newly selected size frame and transmit the page back to the user that includes the preview image in the selected size frame. FIG. 7N shows a web page 787 where that includes a preview image in a new sized frame (8×10 frame).

Referring again to FIG. 7I, web page 750 includes a delight me button 766. Toggling the delight me button 766 results in server 502 selecting a random or pseudo-random feature or effect, generating a preview image that includes the image after the application of the feature or effect, and transmit the page back to the user that includes the preview image. The delight me feature is described in more detail in commonly assigned co-pending U.S. patent application Ser. No. 09/560,222 (entitled "System and Method of Changing Attributes of an Image-Based Product" and filed Apr. 28, 2000), the contents of which is expressly incorporated herein by reference.

Figure 7P:
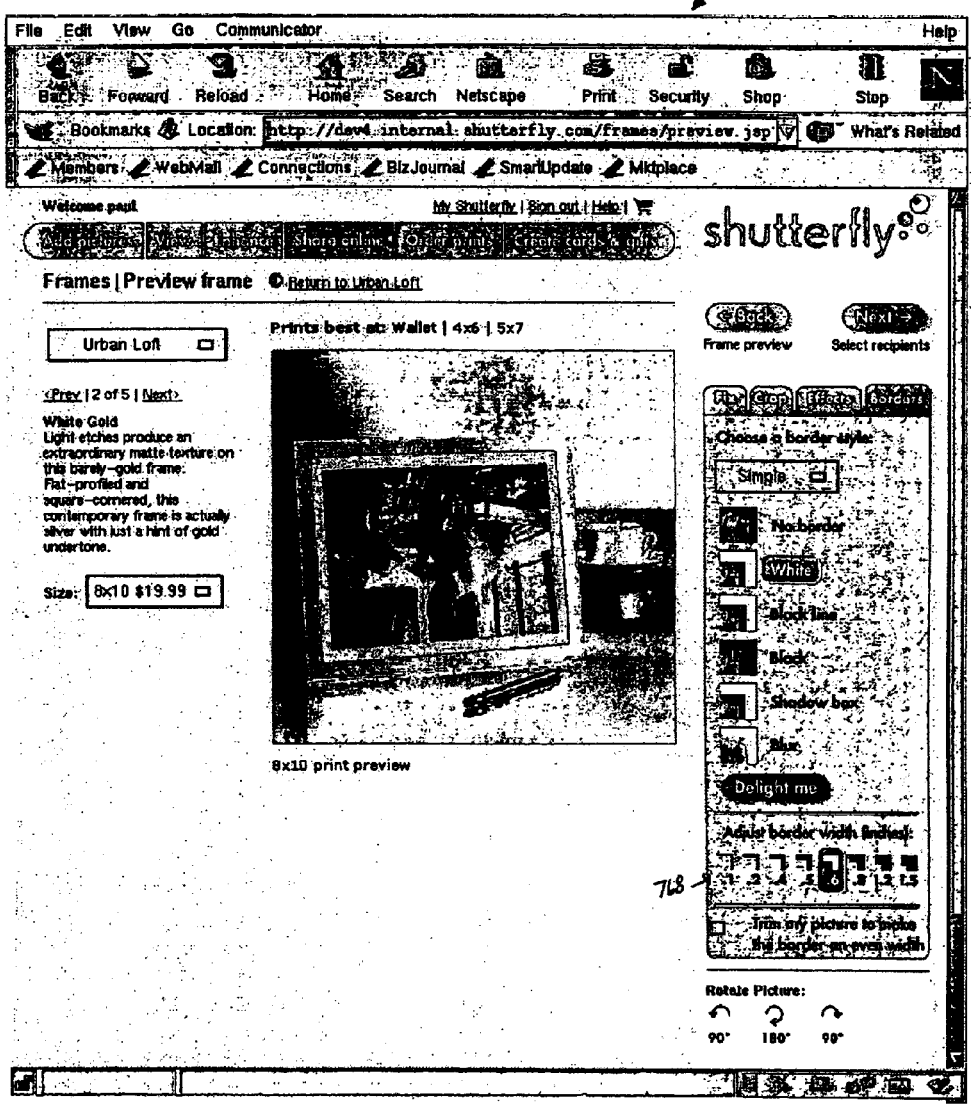

Web page 750 also includes a border adjustment tool 768. The user can manipulate the border adjustment tool 768 as desired. Toggling the border adjustment tool 768 results in server 502 selecting a different size border for the image, generating a preview image that includes the image including the correct sized border and transmit the page back to the user that includes the preview image having the selected border width. FIG. 7P shows a web page 787 where that includes a preview image having a border of 0.6 inches in accordance with the selection made using border adjustment tool 768. Web page 750 also includes a trim command 770. Toggling the trim command 770 results in server 502 trimming the image to make the border selected an even width.

Figure 7Q:
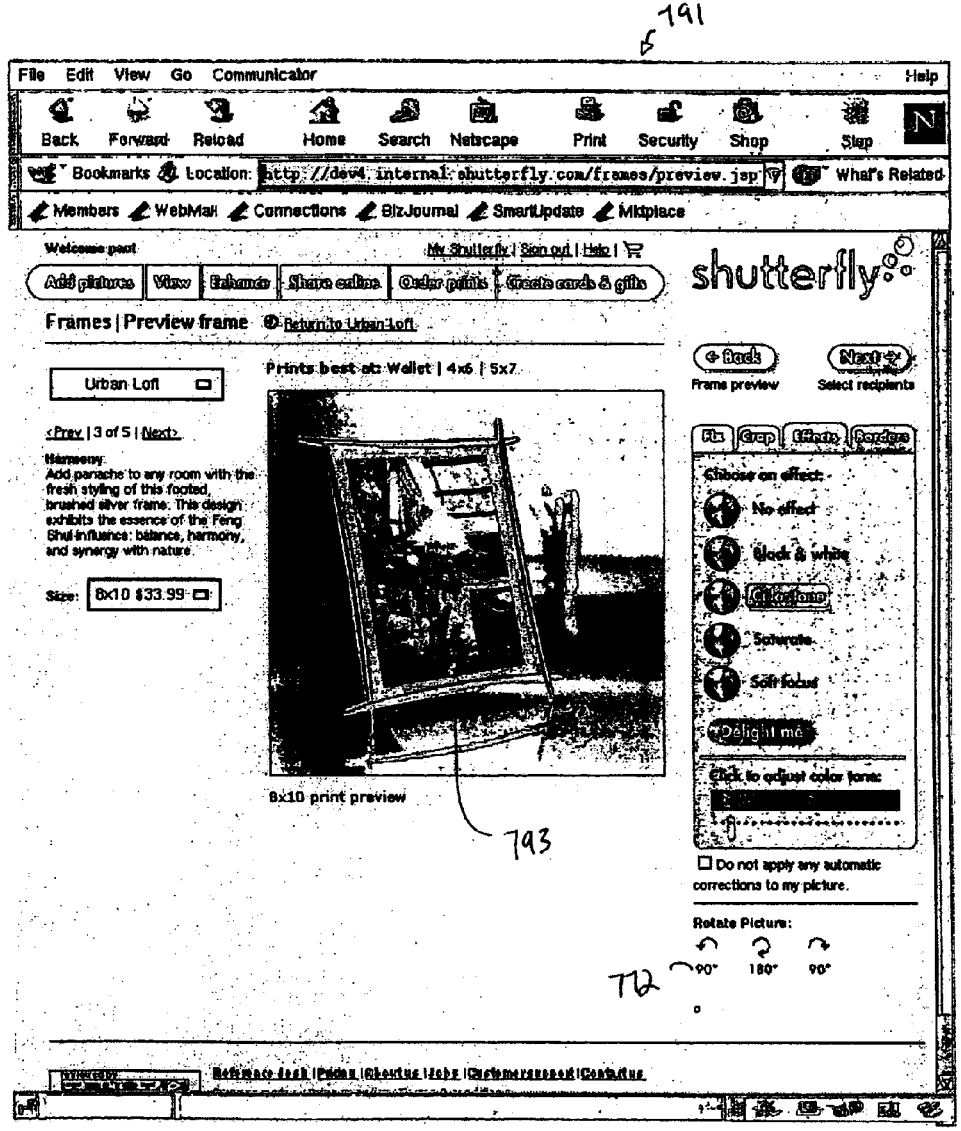

Web page 750 includes a rotation tool 772. Toggling the rotation tool 772 results in server 502 rotating the framed image in the perspective background, generating a preview image that includes the image including the rotated framed image and transmit the page back to the user that includes the preview image having the rotated framed image. FIG. 7Q shows a web page 791 that includes a preview image 793 having a rotated frame in accordance with instructions received from the user (by manipulating rotation tool 772). In the implementation shown, rotation tool 772 includes plural (3) rotation buttons for rotating the frame a predefined amount in a predefined direction. In one implementation, the rotation tool can be configured to rotate the image in the frame, leaving the frame in the same orientation in the perspective view.

Other tools can be accessed using the enhanced edit feature set 754. In the example shown, tabs are included for cropping the image, fixing the image, adjusting the borders and applying effects. Other features can be included. For example, the enhanced feature set can include mattes to enhance the presentation as well as other image based manipulation features.

Returning to the process shown in FIG. 6B, after a preview image is displayed that is acceptable to the user, an order for a framed image print can be received (block 634). For example, the framed image print can be produced by the print lab 520. The print lab 520 can receive the user's selection of an print image and frame, generate an image print including any selected enhanced features from the selected print image, and mount the print image in the selected frame. Then the framed image print can be shipped to the user (block 636).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Figure 8:
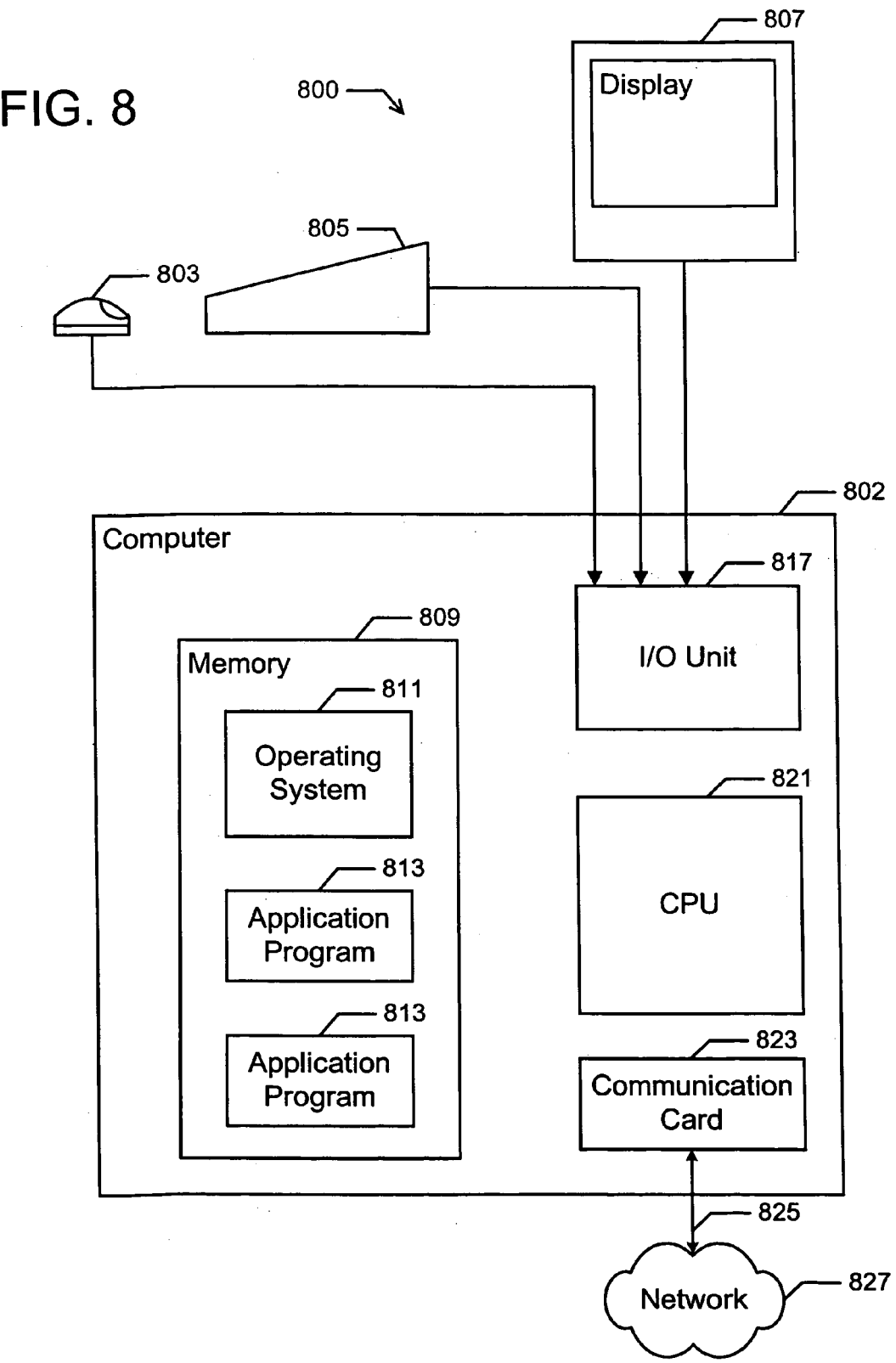
FIG. 8 is a block diagram of a computer system.

An example of one such type of computer is shown in FIG. 8, which shows a block diagram of a computer system 800 suitable for implementing or performing the apparatus or methods of the invention. The computer system 800 illustrated in FIG. 8 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 803, keyboard 805, and display 807) and a general purpose computer 802 having a central processor unit (CPU) 821, an I/O unit 817 and a memory 809 that stores data and various programs such as an operating system 811, and one or more application programs 813. The computer system 800 also typically includes some sort of communications card or device 823 (e.g., a modem or network adapter) for exchanging data with a network 827 via a communications link 825 (e.g., a telephone line).

A number of implementations of the invention have been described. Nevertheless, it will be understood that various modifications may be made without departing from the spirit and scope of the invention.

While the discussion above has focused on the presentation of images in frames, the techniques disclosed are equally well suited for other image based products. For example, a photocard is another example of an image based product that can be presented in accordance with the teachings above. Rather than a non-perspective view of the front of the photocard, a perspective view that shows the photocard in a particular environment can be presented. In addition, the photocard can be illuminated using a natural lighting effect to provide a realistic presentation for the viewer. Other image based products can be presented in similar ways including image based greeting cards, mugs, shirts (t-shirts, golf shirts and the like) and other novelty items. Image based greeting cards can be shown in a perspective view that allows the user to read both the message on the card as well as view the front image. Alternatively, only a portion of the internal greeting may be visible. A shirt can be placed on a mannequin to simulate appearance of the product on a person.

The operations of the processes and methods described here can be performed in a different order and still achieve desirable results. Also, the processes, methods, and systems described here can be used to change a variety of product attributes. Accordingly, other implementations are within the scope of the following claims.

What is claimed is:

1. A method of generating a frame prototype image showing a picture image framed within a frame, the method comprising:
    providing a frame image showing the frame in a perspective view, the frame image having a picture portion corresponding to the portion of the frame used to view a picture mounted in the frame;
    mapping the picture image to the picture portion of the frame image using the illumination of the picture portion of the frame image in order to generate the frame prototype image wherein the perspective frame image is not shown in a head-on view; and
    providing an enhanced edit set along with the frame image, the enhanced edit set including user manipulatable tools for editing either the picture or the frame in the perspective view.

2. The method of claim 1, further comprising identifying a picture portion of the frame image.

3. The method of claim 2, wherein identifying the picture portion of the frame image includes providing a mat identifying the picture portion of the frame image.

4. The method of claim 3, wherein the mat includes a plurality of pixels, each pixel having a pixel value.

5. The method of claim 4, wherein identifying the picture portion of the frame image includes setting each pixel in the mat that corresponds to the picture portion of the frame image to a first pixel value.

6. The method of claim 2, wherein identifying the picture portion of the frame image includes identifying the outer perimeter of the picture portion of the fame image.

7. The method of claim 1, wherein the picture portion of the fame image has a quadrilateral shape and the method further includes identifying the picture portion of the frame image including identifying the four corners of the picture portion.

8. The method of claim 1, further comprising displaying the frame prototype image.

9. The method of claim 1, wherein mapping the picture image to the picture portion of the frame image includes texture mapping the picture image to the picture portion of the frame image.

10. The method of claim 1, wherein the frame image is captured using a digital camera.

11. The method of claim 1 wherein the enhanced image set includes a cropping tool and the method includes
    cropping the picture in accordance with user instructions; and
    presenting the cropped picture in the picture portion of the frame image.

12. The method of claim 1, wherein the enhanced image set includes a border tool and the method includes
    adjusting the border of the picture in accordance with user instructions; and
    presenting the picture including new border in the picture portion of the frame image.

13. The method of claim 1, wherein the enhanced image set includes an effects tool and the method includes
    applying an effect to the picture in accordance with user instructions; and
    presenting the picture including selected effect in the picture portion of the frame image.

14. The method of claim 13, further comprising selecting the effect from the group consisting of black & white, soft focus, color tone and saturate.

15. The method of claim 13, wherein the effect applied is color tone and the method further comprises
    receiving color tone adjustment data and presenting a color tone adjusted picture in the picture portion of the frame.

16. The method of claim 1, wherein the enhanced image set includes a rotation tool and the method includes
    rotating the frame in accordance with user instructions; and
    presenting the rotated famed in the framed image.

17. The method of claim 1, wherein the enhanced image set includes a rotation tool and the method includes
rotating the picture image in the frame in accordance with user instructions; and
presenting the rotated picture image in the frame of the framed image.

18. The method of claim 1, wherein the enhanced image set includes a border tool aid the method includes
receiving a border width selection;
adjusting the border width of the picture image in accordance with the border width selection; and
presenting the picture image including adjusted border in the framed image.

19. The method of claim 1, wherein the enhanced image set includes a frame adjustment button and the method includes
receiving a frame size selection;
changing a size of the frame in the perspective view in accordance with the frame size selection;
mapping the picture image to a picture portion of the new size frame; and
presenting the picture image in the framed image.

20. The method of claim 1, wherein the enhanced image set includes a trimming tool and the method includes
trimming the picture image in accordance with user instructions; and
presenting the trimmed picture image in the frame of the framed image.

21. The method of claim 1, wherein the enhanced image set includes a delight me tool and the method includes
activating the delight me tool upon user request;
automatically selecting a feature or effect to apply to the framed image;
applying the selected feature to the framed image; and
presenting the framed image.

22. The method of claim 21, wherein the step of automatically selecting a feature includes randomly selecting a feature.

23. The method of claim 21, wherein the step of automatically selecting a feature or effect includes selecting a feature or effect to apply to the picture image.

24. The method of claim 21, wherein the step of automatically selecting a feature or effect includes selecting a feature or effect to apply to the frame.

25. A computer program product tangibly embodied in a computer-readable medium, for generating a frame prototype image showing a picture image framed within a frame, comprising instructions operable to cause a computer to:
receive the picture image;
store a frame image showing the frame in a perspective view and a mat identifying the picture portion of the frame image;
map the picture image to the picture portion of the frame image using the illumination of the picture portion of the frame image in order to generate the frame prototype image wherein the frame image is not shown in a head-on view; and
provide an enhanced edit set along with the frame prototype image, the enhanced edit set including user manipulatable tools for editing either the picture or the frame in the perspective view.

26. A system for generating a frame prototype image showing a picture image framed within a frame, the system comprising:
a client computer in communication with a computer network;
a server, in communication with a computer network, having server software embodied in a computer-readable medium, the server software comprising instructions operable to cause the server to:
receive the picture image from the client computer;
store a frame image showing the frame in a perspective view and a mat identifying the picture portion of the frame image; map the picture image to the picture portion of the frame image using the illumination of the picture portion of the frame image in order to generate the frame prototype image wherein the frame image is not shown in a head-on view; and
present an enhanced edit set along with the frame prototype image, the enhanced edit set including user manipulatable tools for editing either the picture or the frame in the perspective view; and
wherein the client computer includes client software embodied in a computer-readable medium, the client software comprising instructions operable to cause the client computer to upload the picture image to the server.

* * * * *